(12) United States Patent
Rohrer

(10) Patent No.: US 11,505,290 B2
(45) Date of Patent: *Nov. 22, 2022

(54) MOUNTING APPARATUS AND RELATED METHODS OF FABRICATING OR RETROFITTING A SURFBOARD WITH SAID MOUNTING APPARATUS

(71) Applicant: Byron Rohrer, San Diego, CA (US)

(72) Inventor: Byron Rohrer, San Diego, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/871,391

(22) Filed: May 11, 2020

(65) Prior Publication Data

US 2020/0407028 A1    Dec. 31, 2020

Related U.S. Application Data

(63) Continuation-in-part of application No. 15/967,399, filed on Apr. 30, 2018, now Pat. No. 10,647,391, which is a continuation-in-part of application No. 15/799,308, filed on Oct. 31, 2017, now Pat. No. 10,308,329.

(60) Provisional application No. 62/415,442, filed on Oct. 31, 2016.

(51) Int. Cl.
  *B63B 32/77*  (2020.01)
  *B63B 32/70*  (2020.01)

(52) U.S. Cl.
  CPC ............. *B63B 32/77* (2020.02); *B63B 32/70* (2020.02)

(58) Field of Classification Search
  CPC ......... B63B 32/45; B63B 32/70; B63B 32/73; B63B 32/77
  See application file for complete search history.

(56) References Cited

U.S. PATENT DOCUMENTS

| | | | |
|---|---|---|---|
| 3,453,013 A * | 7/1969 | Jeffries | ................. E05C 19/026 292/18 |
| 4,528,924 A * | 7/1985 | Marker | ................... B63B 32/45 114/39.19 |
| 4,592,734 A | 6/1986 | Richard | |
| 5,460,558 A | 10/1995 | Woodstock | |
| 5,484,312 A | 1/1996 | Zepeda | |
| 5,544,919 A | 8/1996 | Tinkler | |
| 5,591,060 A | 1/1997 | Forsyth | |
| 6,035,799 A | 3/2000 | Lukanovich | |
| 7,182,261 B2 | 2/2007 | Chen | |
| 8,150,248 B1 | 4/2012 | Woodman | |
| 8,672,719 B2 | 3/2014 | Grimes | |
| 9,833,685 B2 | 12/2017 | Tomer | |
| 10,647,391 B2 * | 5/2020 | Rohrer | ................... B63B 71/00 |
| 2007/0032149 A1 | 2/2007 | Sebba | |
| 2010/0061711 A1 | 3/2010 | Woodman | |
| 2011/0294381 A1 | 12/2011 | Nazzari | |

FOREIGN PATENT DOCUMENTS

WO      2016054690      1/2016

* cited by examiner

*Primary Examiner* — Stephen P Avila
(74) *Attorney, Agent, or Firm* — Buche & Associates, P.C.; John K. Buche; Bryce A. Johnson

(57) ABSTRACT

Disclosed is a surfboard foothold with at least one digit that is removably provided to a receiver with a digited footprint in a surface of a surfboard.

5 Claims, 42 Drawing Sheets

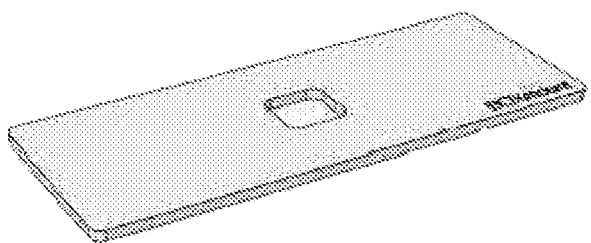
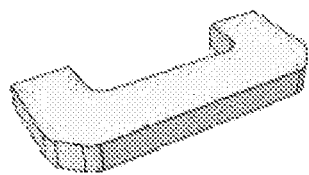
FIG. 3B
FIG. 3C
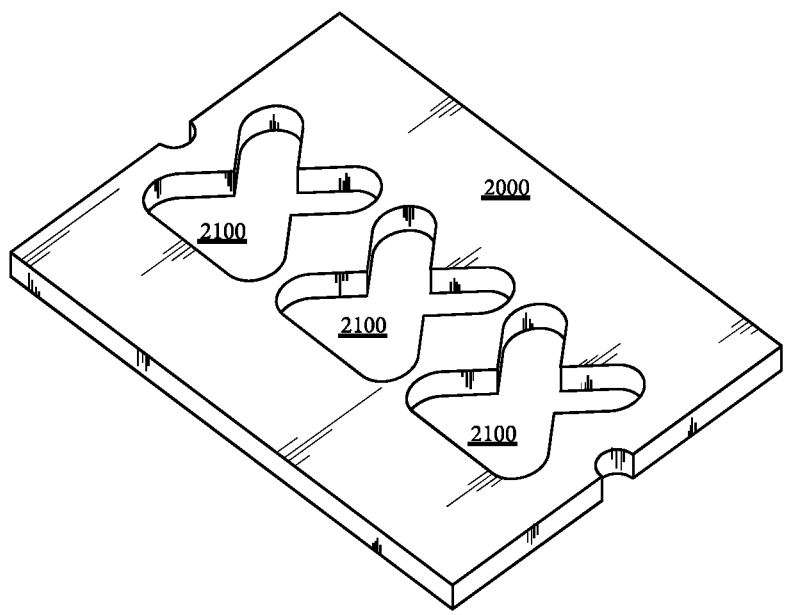
FIG. 3
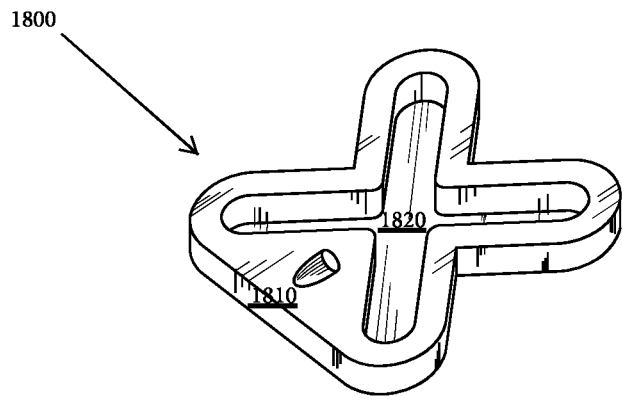
FIG. 3A

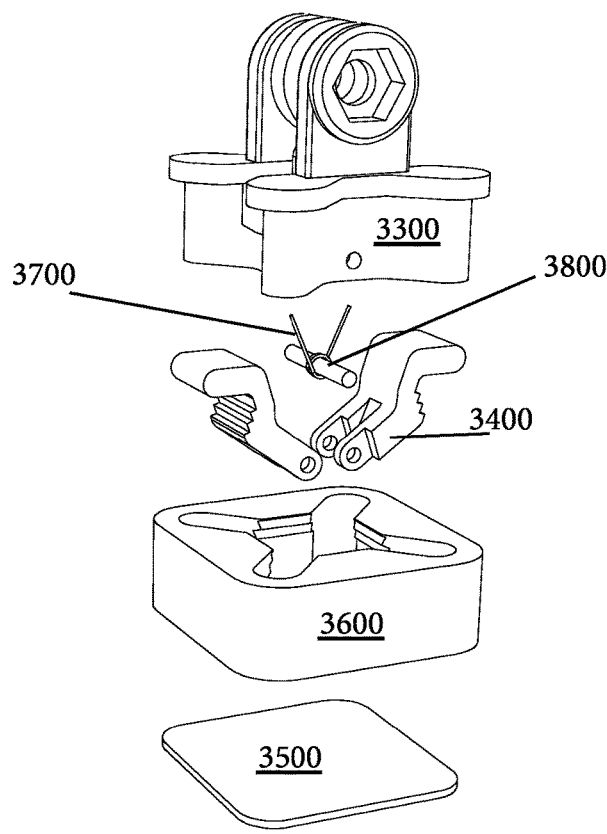
FIG. 18
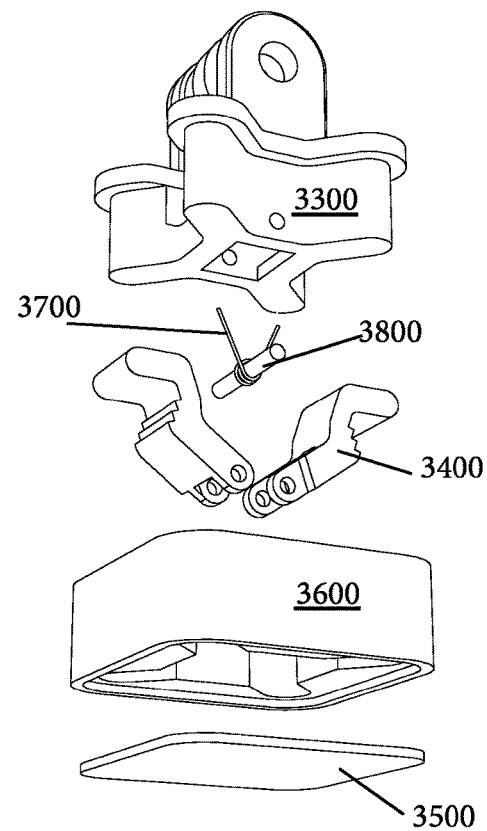
FIG. 19
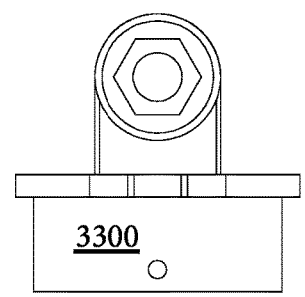
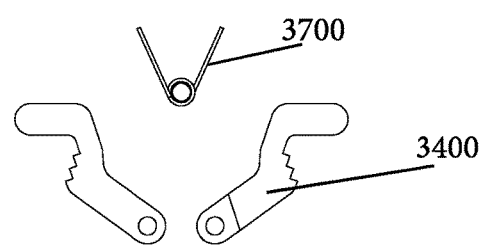
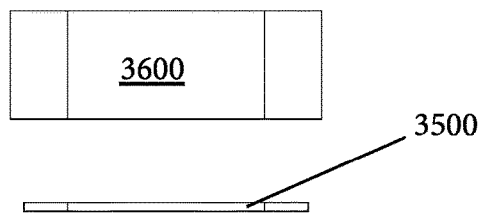
FIG. 20

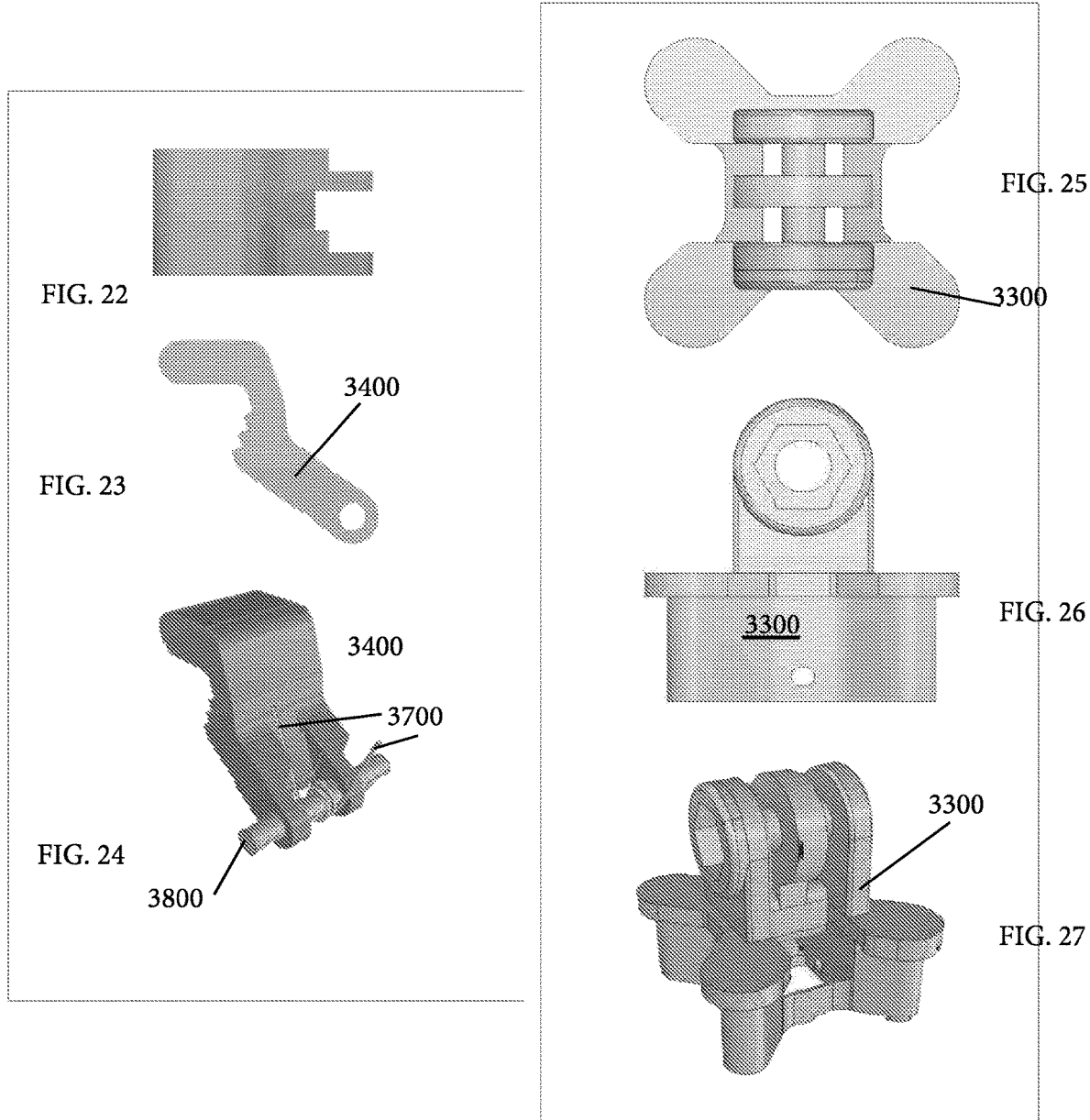

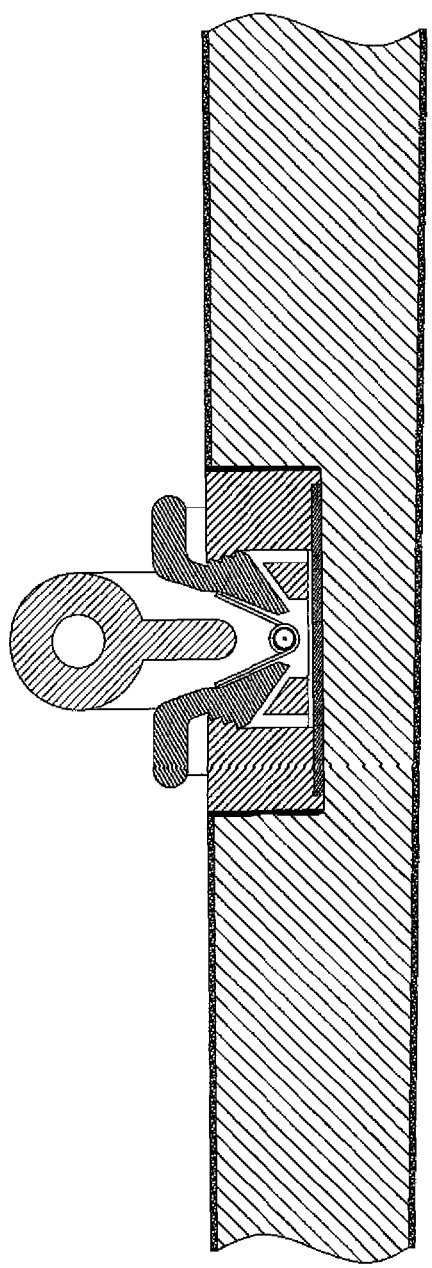

FIG 40A
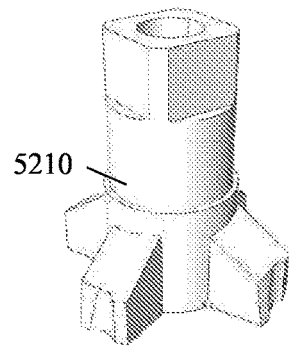
FIG 40B
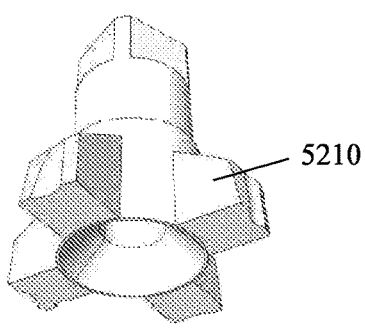
FIG 41A
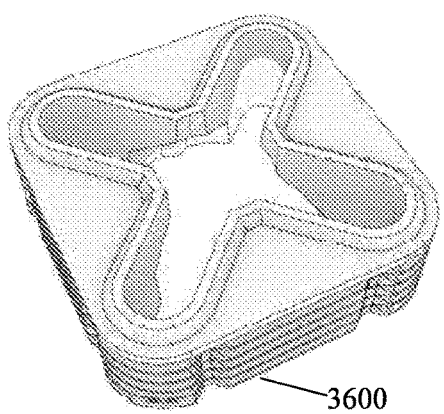
FIG 41B
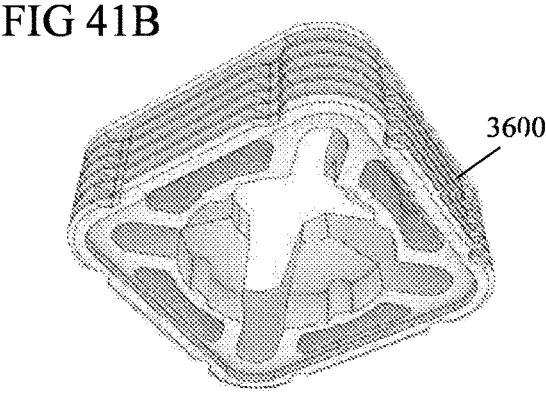
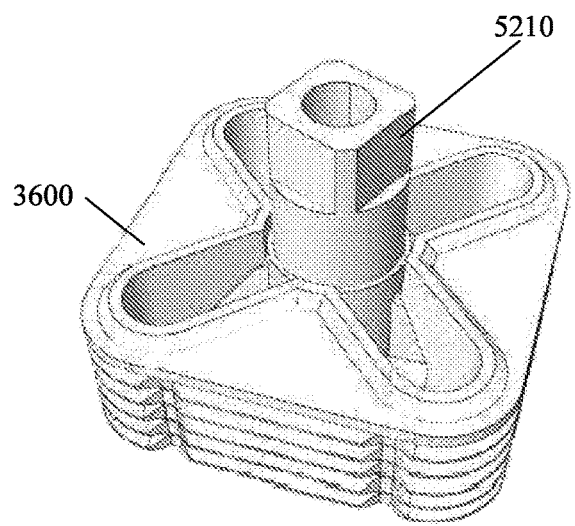
FIG 42A
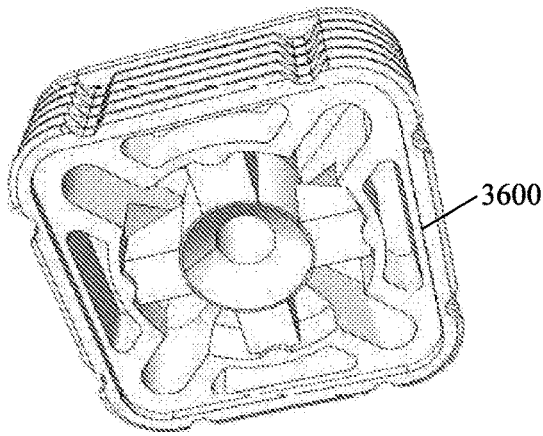
FIG 42B

3620

3620

5100

5100

5100

5100

5100

5100

5200

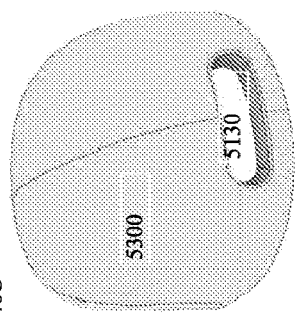
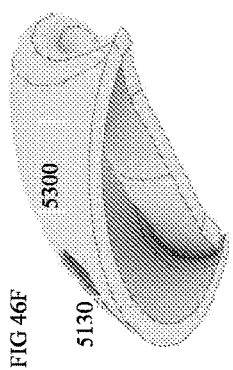
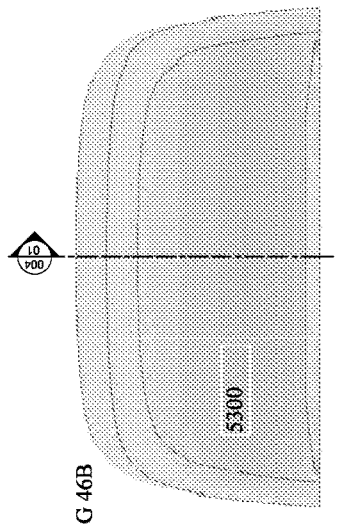
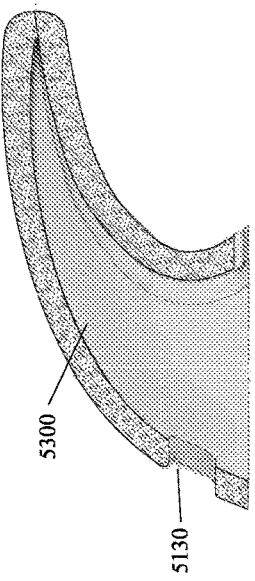
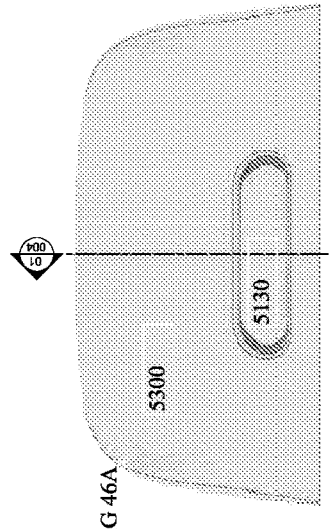
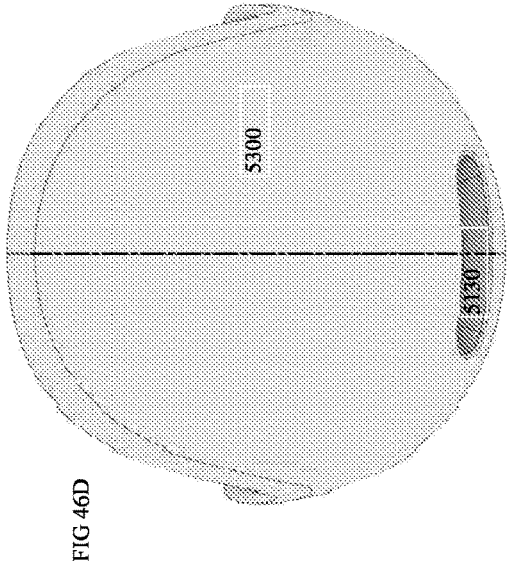

3600

3600

3600

3600

3600

3600

3600

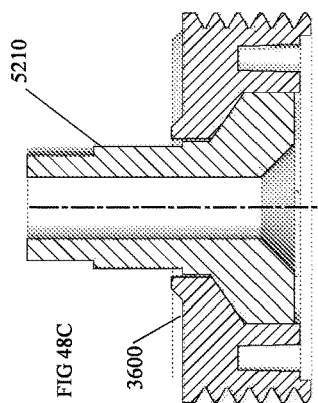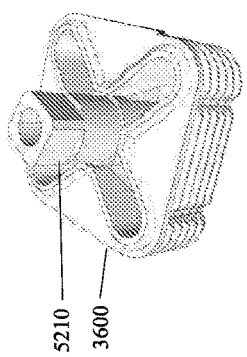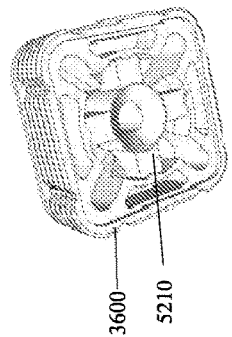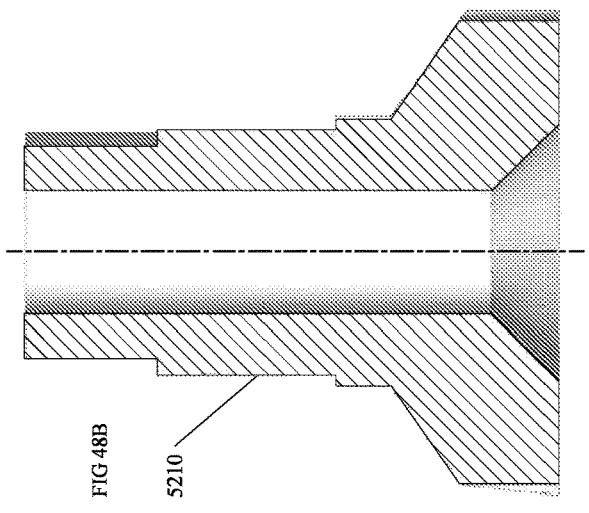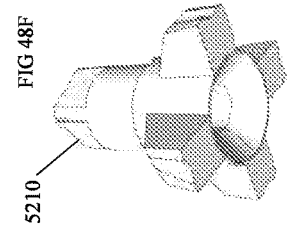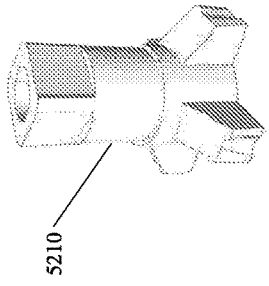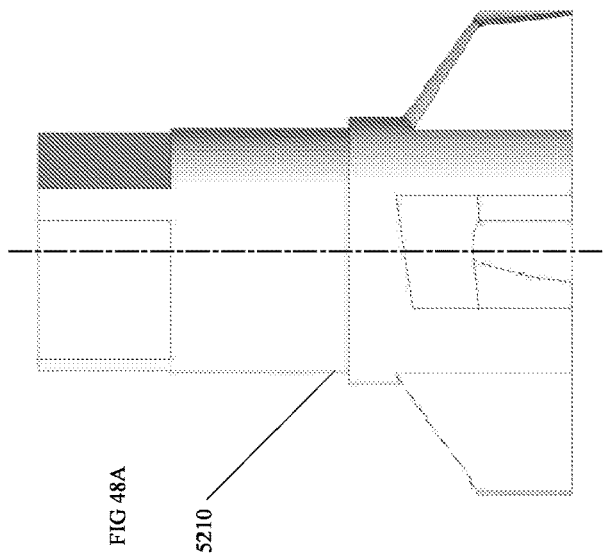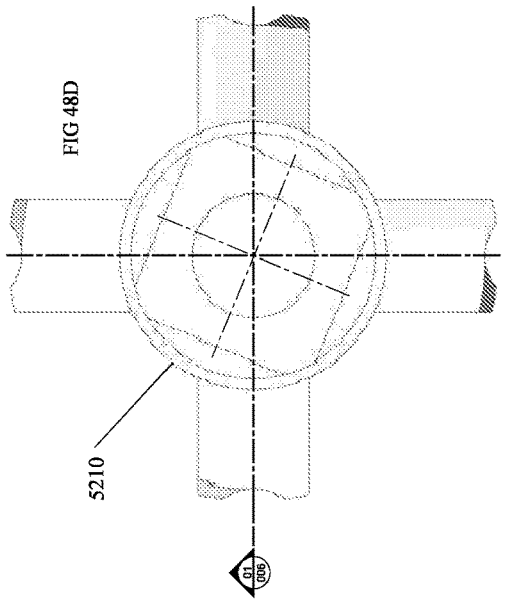

3620

3620

3620

3620

3620

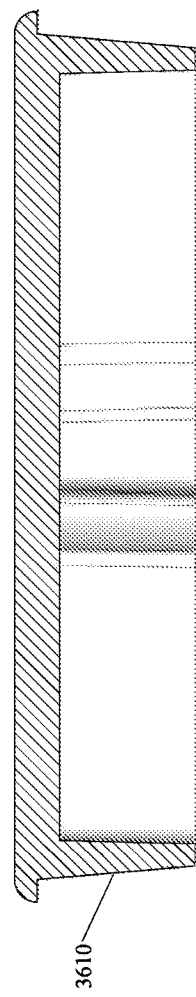
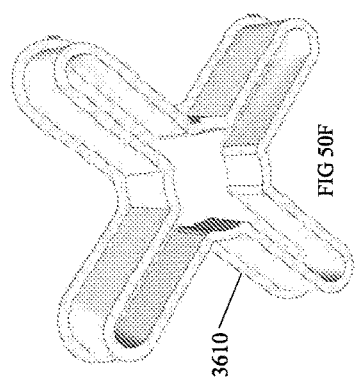
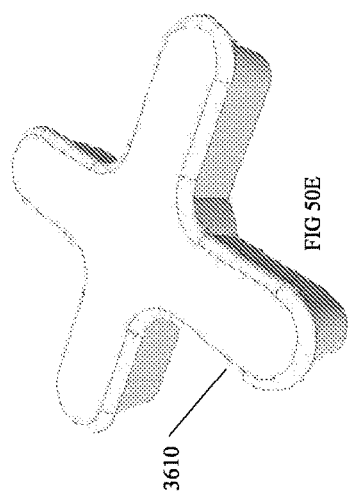
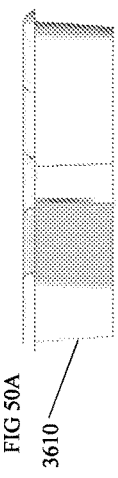
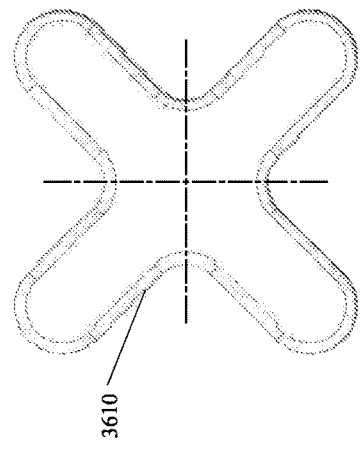
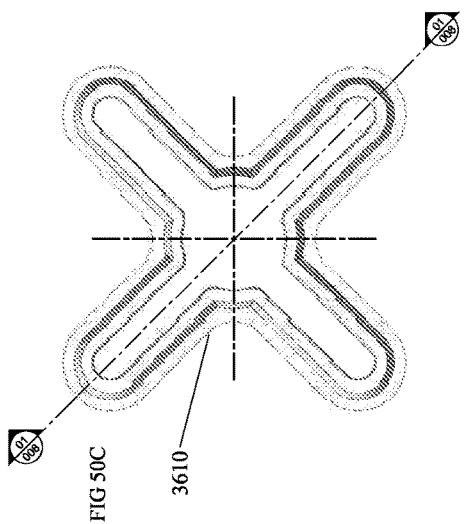

MOUNTING APPARATUS AND RELATED METHODS OF FABRICATING OR RETROFITTING A SURFBOARD WITH SAID MOUNTING APPARATUS

CROSS-REFERENCE TO RELATED APPLICATIONS

This application is a continuation-in-part of U.S. patent application Ser. No. 15/967,399 which is a continuation-in-part of U.S. patent application Ser. No. 15/799,308 (filed Oct. 31, 2017). U.S. patent application Ser. No. 15/799,308 claims the benefit and priority of U.S. Prov. App. Ser. No. 62/415,442 (filed Oct. 31, 2016). All the above referenced documents are hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of mounting apparatuses for surfboard or other floating objects. The disclosed subject matter is also in the related fields of fabricating or retrofitting surfboards or other floating objects with mounting apparatuses.

Background of the Invention

Surfboards are elongated floating platforms used in the sport of surfing. A basic surfboard 1000, shown in FIG. 1, is essentially a hydrodynamically shaped plank. The topside 1100 of the plank is known colloquially as the deck. The underside 1200 of the plank is known as the bottom. The front 1300 and back 1400 of the plank are respectively dubbed the nose and tail. Finally the left side 1500 and right side 1600 of the plank are known as the rails. Some surfboards 1000 have fins 1700 that extend from the bottom 1200 of the board 1000 adjacent to its tail 1400. Modern surfboards are made of polyurethane or polystyrene foam covered with layers of fiberglass cloth and polyester or epoxy resin. In use, a surfer rides on the deck of the surfboard while the board moves along the forward face (also known as the deep face) of a moving wave.

With the advent of waterproof and handheld cameras, surfers have carried cameras during a surf session so that the activity can be recorded in moving pictures with a close-up or point-of-view camera angle. Handheld cameras can be problematic when a surfer needs both hands while surfing. So, a need exists for hand-free operation of cameras during surf sessions. Mouthpiece camera mounts for surfer operation of cameras during a surf session are known. Cameras can also be mounted to a surface of the surfboard, but mounts have not yet been ideal because surfboards are preferably streamlined and seamless to ensure that the plank is as hydrodynamic as possible.

SUMMARY OF THE INVENTION

In view of the foregoing, an object of this invention is to disclose mounting apparatus for mounting cameras and other items to surfboard or other floating objects. The disclosed subject matter is also in the related fields of fabricating or retrofitting surfboards or other floating objects with such mounting apparatus. In one embodiment, the mounting apparatus is defined by a base with a socket. In a preferred mode of fabrication or retrofitting of a surfboard with a mount, a template or stencil of a mount's footprint is positioned between a router and a surfboard, a hole that is generally in the shape of said footprint is cut to a predetermined depth in the surface of the surfboard by the router, the mount is installed in said hole so that the socket is provided to the surface, and a camera mount, or mounting plate with a plug is provided to the mount wherein the plug and socket mate.

The disclosed mount could be provided to any surface according to the methods described. So, the mount could be installed on dash boards of vehicles, snow boards, countertops, or any other surface. In some embodiments, the mount could be installed on a helmet.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 3 is a perspective view of a template 2000;

FIG. 3A is a perspective view of a mount 1800;

FIG. 3B is a perspective view of an alternate embodiment of a template 2000;

FIG. 3C is a perspective view of a router guage;

FIG. 18 is a perspective exploded view of the camera mount 3300;

FIG. 19 is an exploded view of the camera mount 3300 from an upward angle perspective;

FIG. 20 is an exploded view of the camera mount 3300 from the front;

FIG. 22 is an orthogonal view of the mounting clamp 3400 from the top;

FIG. 23 is an orthogonal view of the mounting clamp 3400 from the side;

FIG. 24 is a perspective view of the mounting clamp 3400 with the connecting rod 3800 and spring clip 3700 attached;

FIG. 25 is an orthogonal view of the camera mount 3300 from the top;

FIG. 26 is an orthogonal view of the camera mount 3300 from the side;

FIG. 27 is a perspective view of the camera mount 3300;

FIG. 29 is a cross section of the mounting mount 3300 in the mounting base 3600 in a surfboard;

FIG. 40A shows a perspective view of the foothold securing piece 5210;

FIG. 40B shows a perspective view of the foothold securing piece 5210;

FIG. 41A shows a perspective view of the receiver 3600;

FIG. 41B shows a perspective view of the receiver 3600;

FIG. 42A shows a perspective views of the foothold securing piece 5210 placed inside the receiver 3600;

FIG. 42B shows a perspective view of the foothold securing piece 5210 is placed inside the receiver 3600;

FIG. 46A shows a front detail view of the foothold hood 5300;

FIG. 46B shows a front detail view of the foothold hood 5300;

FIG. 46C shows a front detail view of the foothold hood 5300;

FIG. 46D shows a front detail view of the foothold hood 5300;

FIG. 46E shows a front detail view of the foothold hood 5300;

FIG. 46F shows a front detail view of the foothold hood 5300;

FIG. 48A shows a side detail view of the foothold securing piece 5210;

FIG. 48B shows a sectional detail view of the foothold securing piece 5210;

FIG. 48C shows a sectional detail view of the foothold securing piece 5210 inside the mounting base 3600;

FIG. 48D shows a top detail view of the foothold securing piece 5210;

FIG. 48E shows a perspective view of the foothold securing piece 5210;

FIG. 48F shows a perspective view of the foothold securing piece 5210;

FIG. 48G shows a perspective view of the foothold securing piece 5210 inside the mounting base 3600;

FIG. 48H shows a perspective view of the foothold securing piece 5210 inside the mounting base 3600;

FIG. 50A shows a side detail view of the mounting base plug 3610;

FIG. 50B shows a top detail view of the mounting base plug 3610;

FIG. 50C shows a bottom detail view of the mounting base plug 3610;

FIG. 50D shows a sectional detail view of the mounting base plug 3610;

FIG. 50E shows a perspective view of the mounting base plug 3610;

FIG. 50F shows a perspective view of the mounting base plug 3610;

Figure 1:
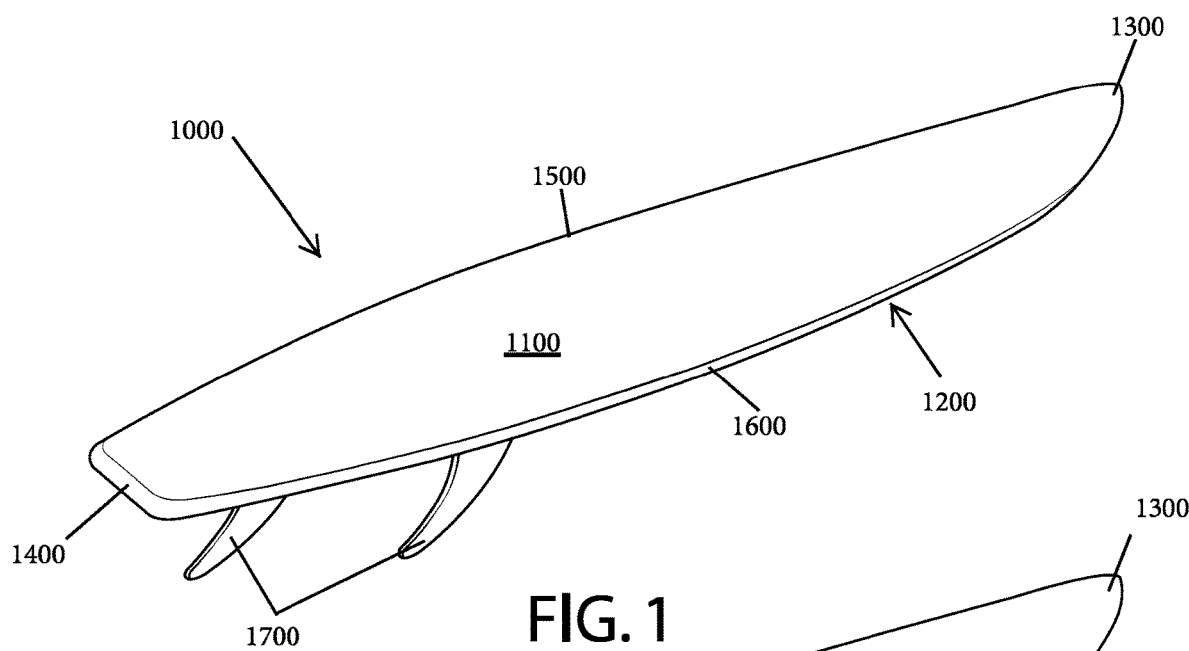
FIG. 1 is a perspective view of a surfboard 1000.

In the figures, the following items correspond to the associated reference numeral in the drawings:

surfboard—1000
topside—1100
underside—1200
front—1300
back—1400
left side—1500
right side—1600
fins—1700
mount—1800
base—1810
set hole—1811
socket—1820
base hole—1830
mounting plate—1900
mount surface—1910
plug—1920
connector—1930
coupling—1940
template—2000
router guide—2100
pole—3000
pole attachment—3100
dual attachment—3200
camera mount—3300
mounting clamp—3400
undersurface area—3500
mounting base—3600
mounting base plug—3610
mounting base support structure—3620
mounting base through pin—3630
spring clip—3700
connecting rod—3800
camera—4000
foothold—5000
foothold structure—5100
securement opening—5110
securing piece alley—5120
foothold platform—5130
foothold anchor—5200
foothold securing piece—5210
foothold flag piece—5220
foothold spring—5230
foothold pin—5240
foothold hood—5300
hood opening—5310.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a mount for attaching objects, like cameras and bindings to the surfaces of a surfboard. Further disclosed are related methods of fabricating or retrofitting a surfboard with said mount. The more specific details of the disclosed mount and related methods are described in connection with the figures.

Figure 2:
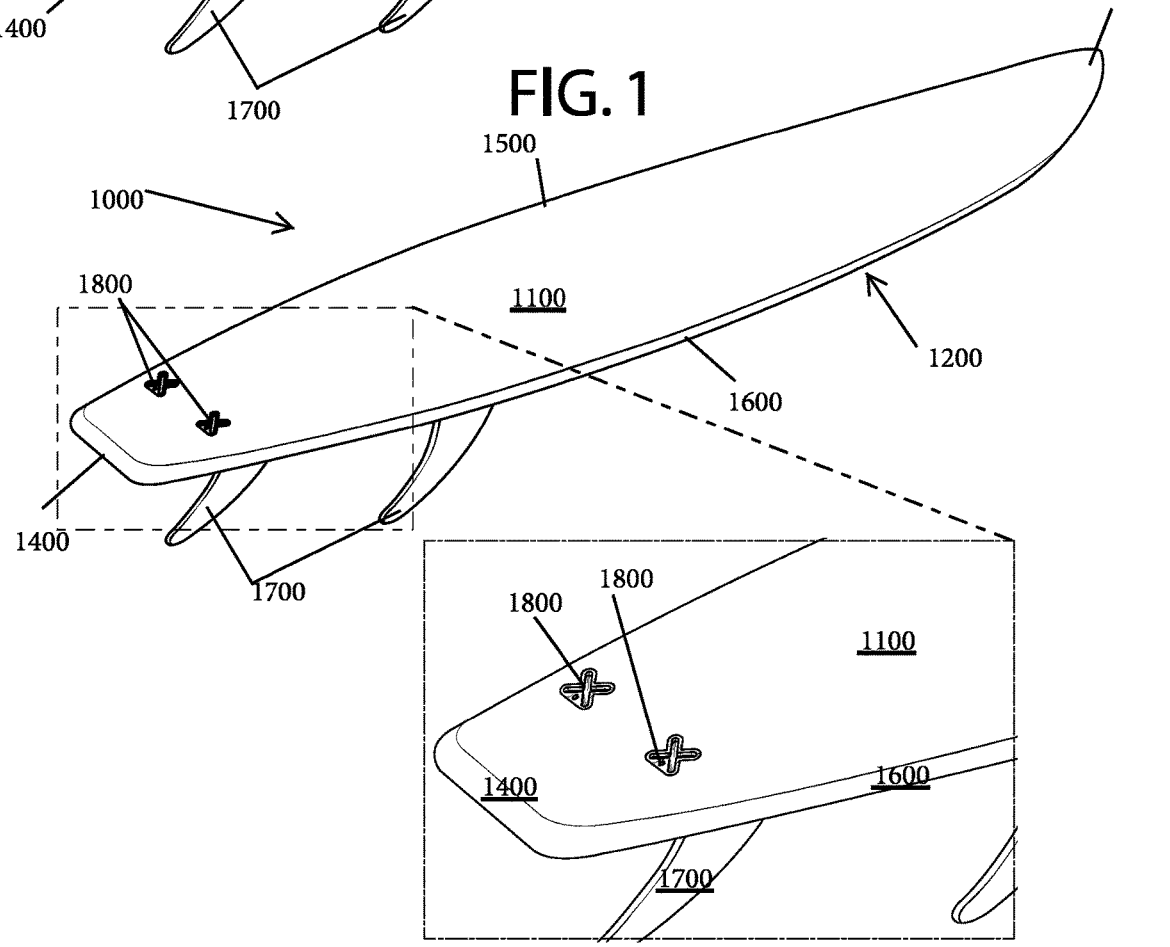
FIG. 2 is a perspective view and zoom-in view of an improved surfboard 1000.

FIG. 1 is a perspective view of a surfboard 1000. As shown, the surfboard 1000 generally features a deck 1100, a bottom 1200, a nose 1300, a tail 1400, a left side rail 1500, a right side rail 1600, and fins 1700. FIG. 2 is a perspective view and zoom-in view of an improved surfboard 1000, where mounts 1800 have been installed flush with the deck 1100 of the surfboard 1000 of FIG. 1.

FIG. 3 is a perspective view of a template 2000. FIG. 3A is a perspective view of a mount 1800 (that could also be considered a receiver), where the mount is defined by a base 1810 a socket 1820 or receptacle. The template 2000 features cut-outs, including at least one cut out, that define router-guides 2100 that are the same size and shape as the footprint of the base 1810 of the mount 1800. Suitably, the template 2000 and mount may be constructed of plastics and, in a preferred embodiment, manufactured by a 3-D printer.

Figure 4:
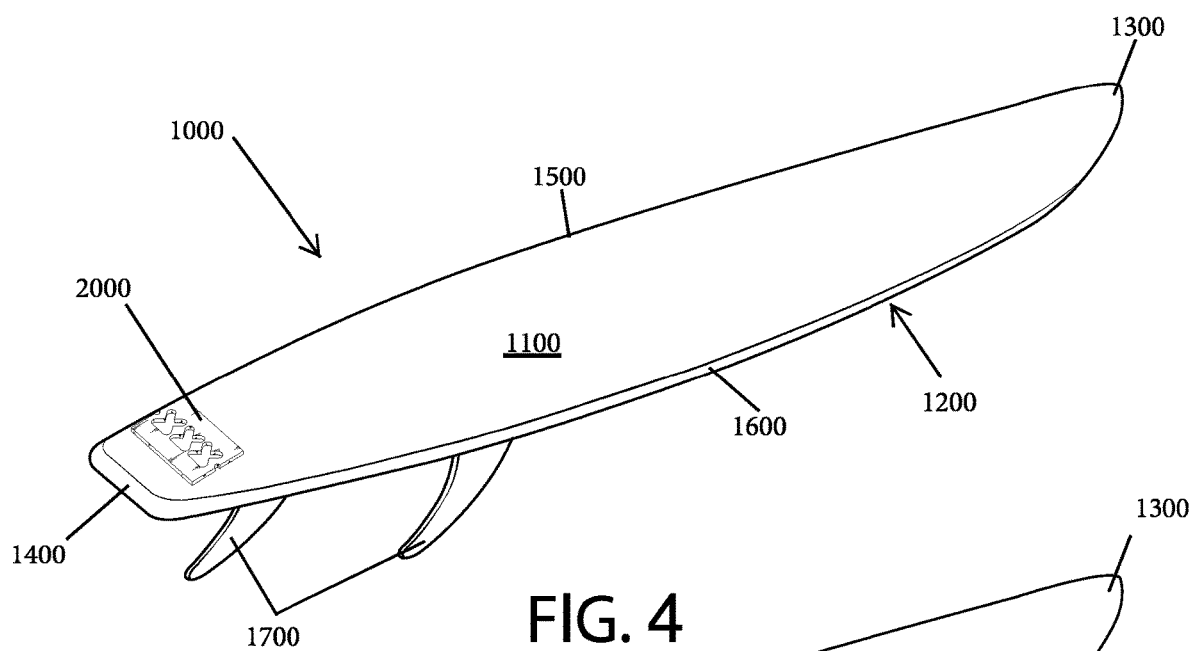
FIG. 4 is an environmental perspective view of a surfboard 1000 and template 2000.
Figure 5:
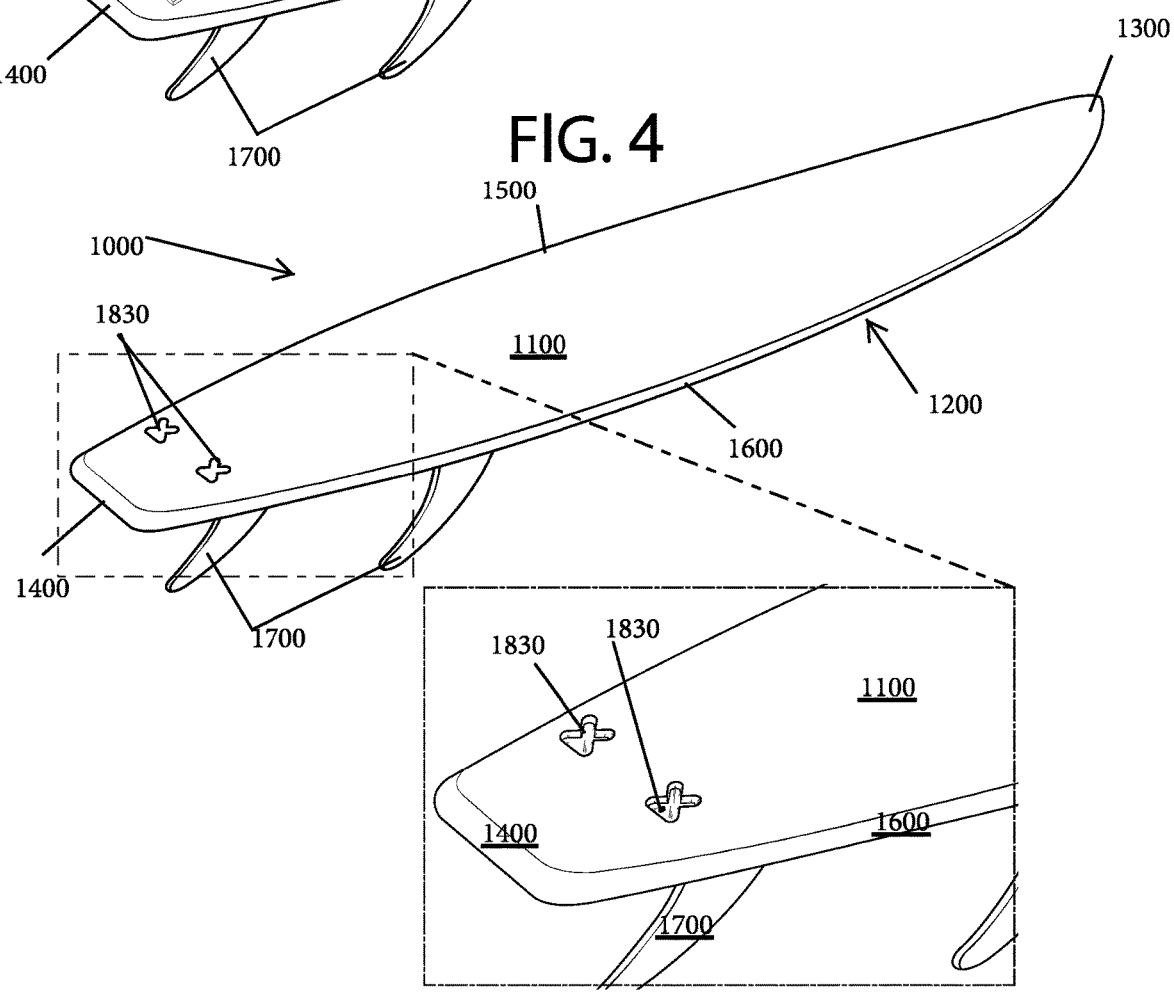
FIG. 5 is an environmental perspective view and zoom-in view of an improved surfboard 1000 with base hole 1830.

FIG. 4 an environmental perspective view of a surfboard 1000 and template 2000. FIG. 5 is an environmental perspective view and zoom-in view of an improved surfboard 1000 with base hole 1830. Suitably, the template 2000 may be disposed on a surface, e.g. the surface of the deck 1100 of a surfboard 1000 to act as a stencil for cutting a base hole 1830 (FIG. 5) via a router into the underlying surface 1100 of the surfboard 1000 to a predefined depth (the depth of the mount 1800) so that a mount 1800 may be placed into the hole 1830 and installed flush with said underlying surface (see FIG. 2). Suitably, if the base hole 1830 results in the misalignment of the mount 1800 and the surface 1100, the mount may be sanded or filled so that the surface and mount 1800 are flush. Suitably, the mount 1800 may be installed on any surface and at any point of the surfboard 1000 and any positions of the mount 1800 illustrated in the figures are preferred and illustrative of positioning of the mount at any point.

As shown in the figures, the foot print of the base 1810 and corresponding hole 1830 are generally in the shape of an X or otherwise feature digits. While the footprint of the base 1810 and hole 1830 may be any shape, a digited shape, like an X or ½ X, Y, K, T, Q, A, V, Z, *, +, <, >, is preferred because, the hole 1830 cannot be established too deep within the surface of the surfboard 1000 without compromising the structural integrity of the board 1000. A digited footprint provides additional surfaces for interfacing of the base 1810 and the hole 1830 whereby a more sturdy connection between the base 1810 and surfboard can be had. Additionally, digited footprints, like and X or asterisk, can be more aesthetically pleasing than basic shapes.

Figure 6:
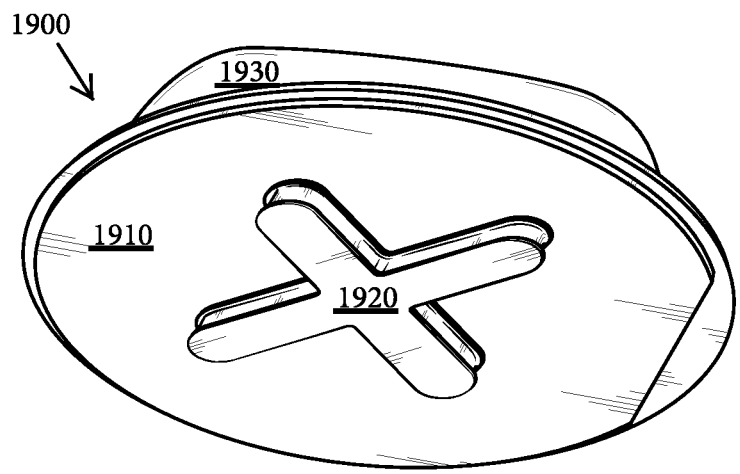
FIG. 6 is an underneath perspective of a mounting plate 1900 of a connector 1930.
Figure 7:
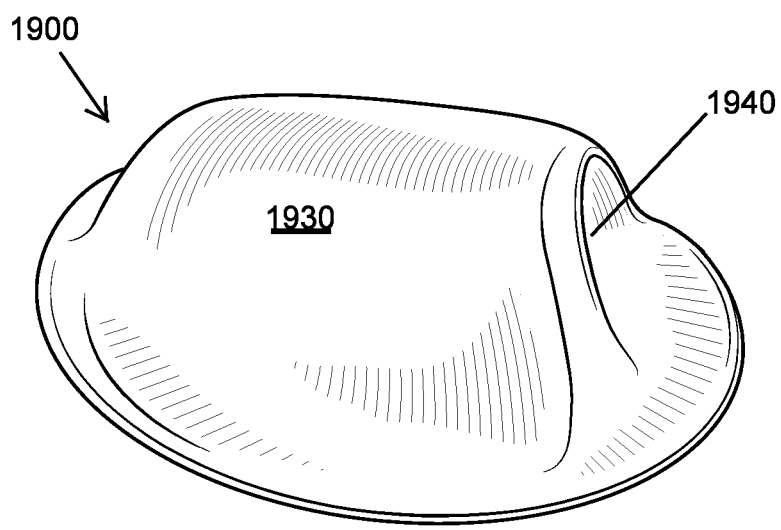
FIG. 7 is a top perspective of a mounting plate 1900 of a connector 1930.
Figure 8:
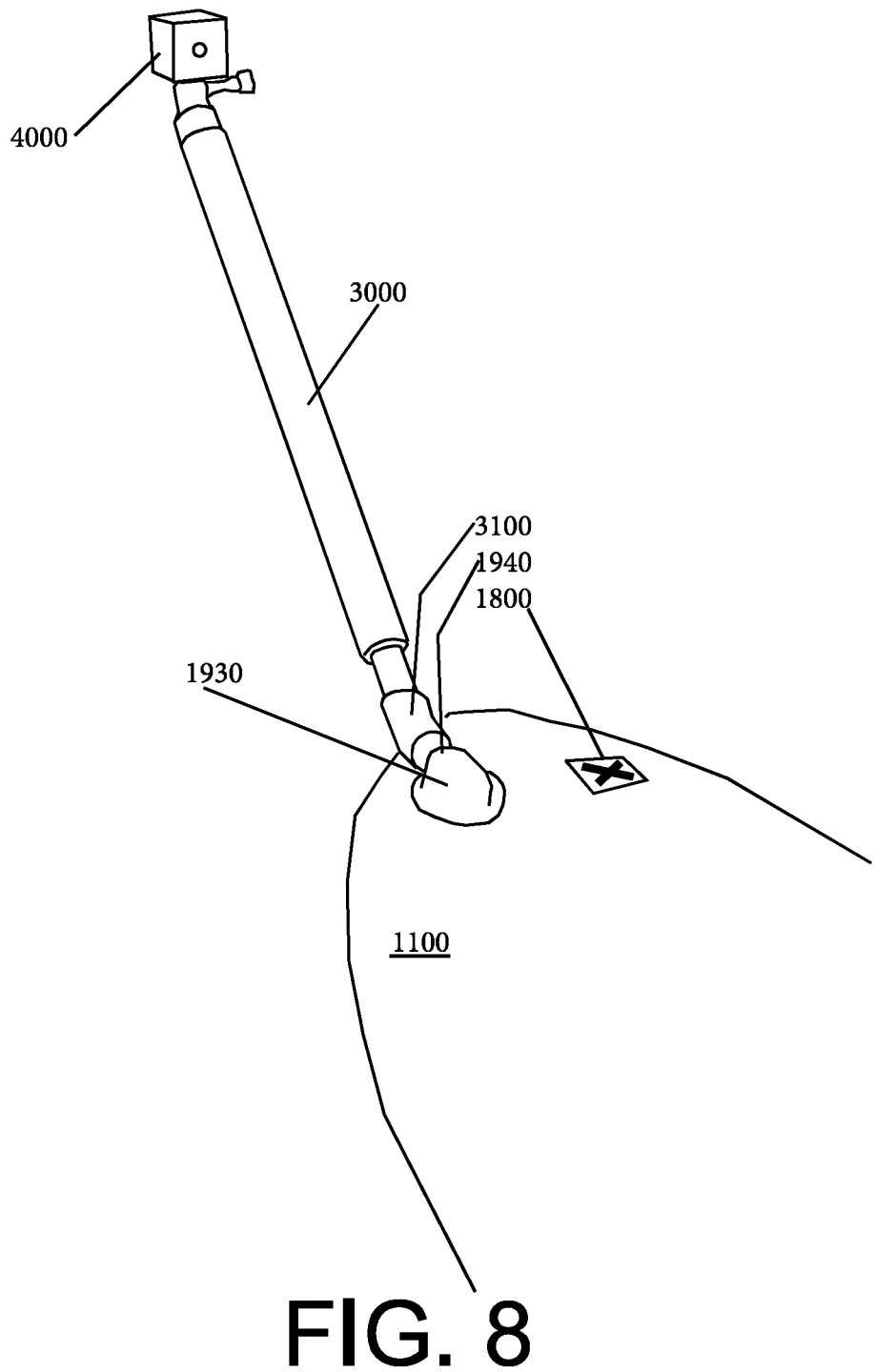
FIG. 8 is an environmental view of a camera 4000 mounted on a pole 3000 that is coupled to a connector 1930.
Figure 9:
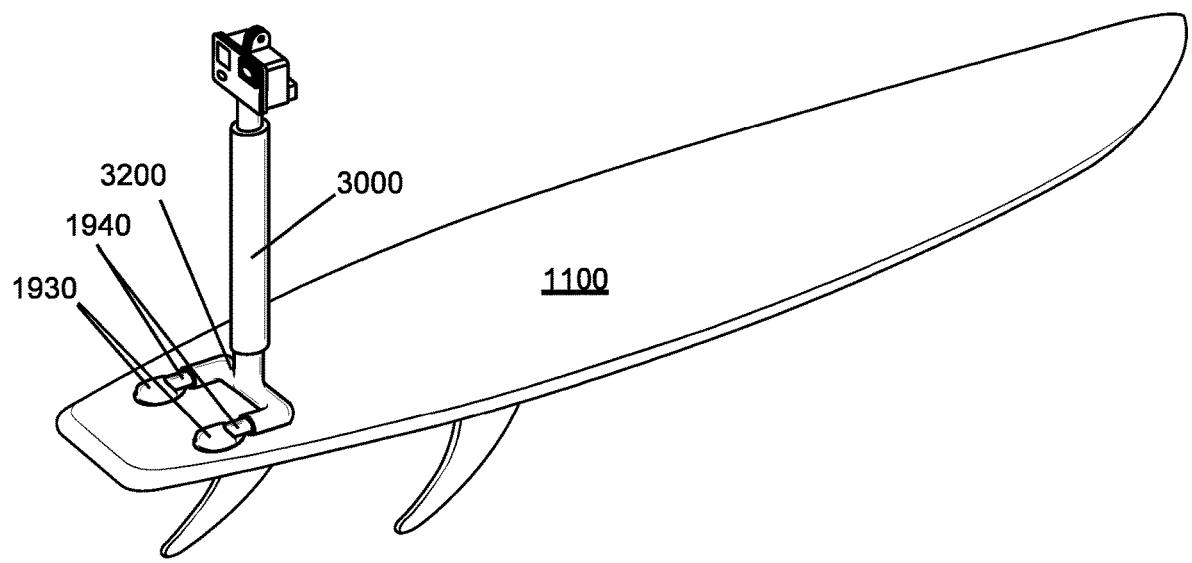
FIG. 9 is another environmental view of a camera 4000 mounted on a pole 3000 that is coupled to two connectors 1930.

FIG. 6 is an underneath perspective of a mounting plate 1900 of a connector 1930. FIG. 7 is a top perspective of a mounting plate 1900 of a connector 1930. FIG. 8 is an environmental view of a camera 4000 mounted on a pole 3000 that is coupled to a connector 1930. Suitably, a mounting plate 1900 features a plug 1920 that corresponds to the socket 1820 of a mount 1800 and a mount surface 1910 that corresponds to the surface 1100 of a surfboard 1000 so that the mounting plate 1900 may be coupled to the mount 1800 via cooperation of the plug 1920 and socket 1820. As shown in FIG. 3A, the base 1810 may have a set hole so that the plug 1920 and socket 1829 may be more fixedly secured. Ultimately, the mounting plate 1910 may accommodate a connector 1930 that can be used, for instance, to receive a pole 3000 of a camera 4000 via a receptacle 1940 and a pole connector 1930. FIG. 9 is another environmental view of a camera 4000 mounted on a pole 3000 that is coupled to two connectors 1930 instead of a single connector for added stability.

Figure 10:
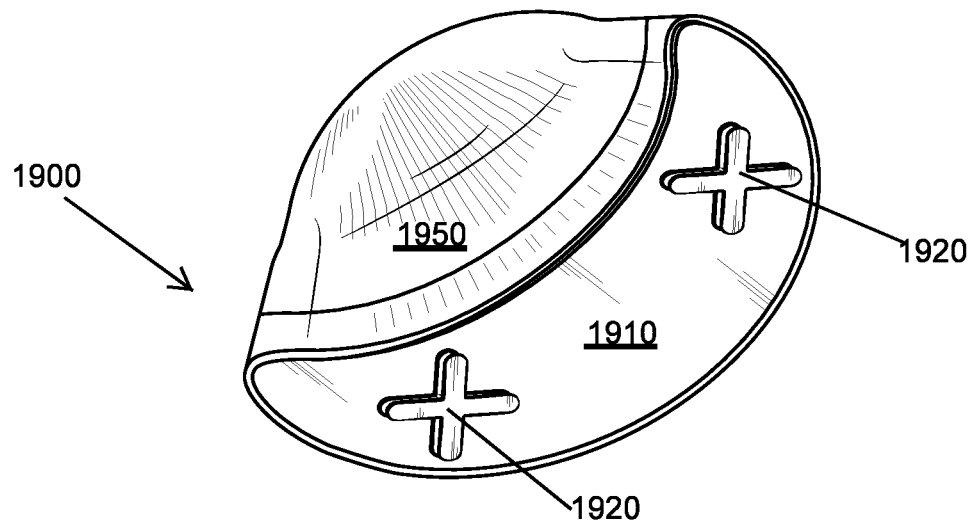
FIG. 10 is a is an underneath perspective view of a mounting plate 1900 of a binding 1950.
Figure 11:
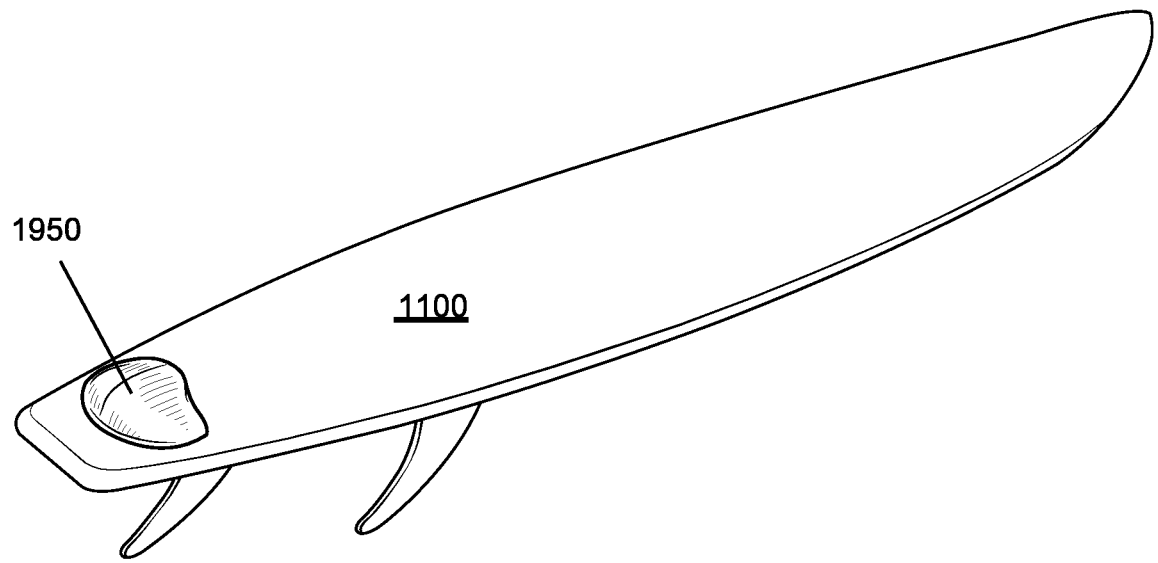
FIG. 11 is an environmental view of a surfboard 1000 that has a binding mounted on its deck 1100.
Figure 14:
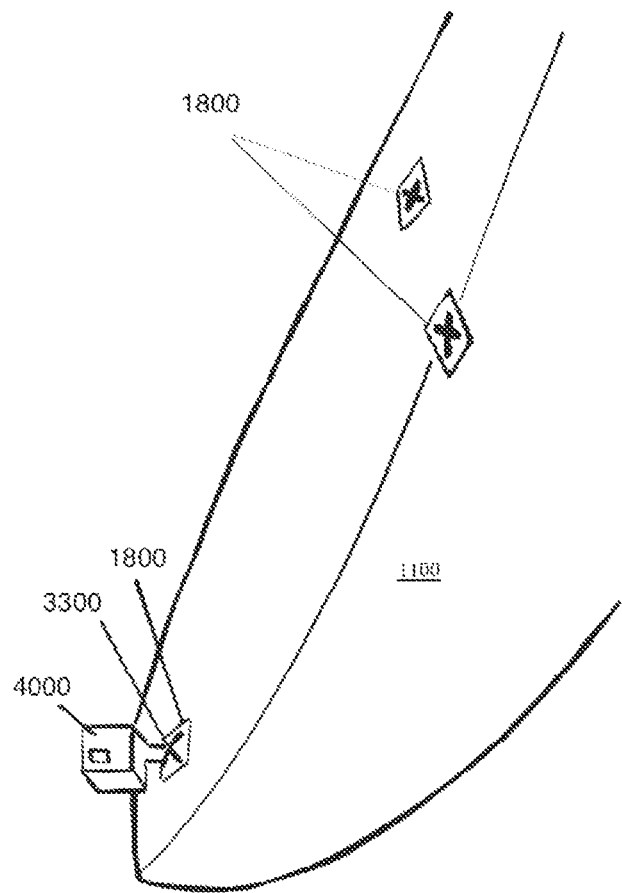
FIG. 14 is an alternative view of the surfboard 1000 of FIG. 14 with the binding removed.
Figure 15:
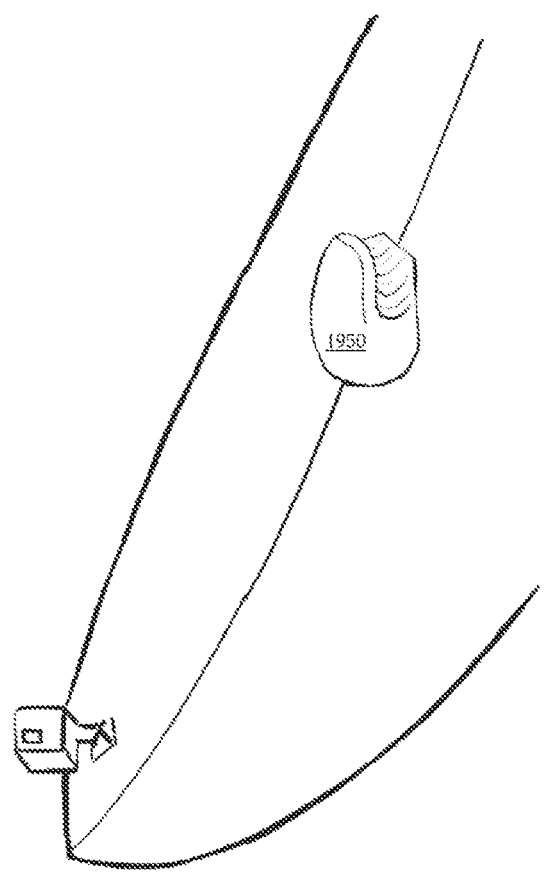
FIG. 15 is another environmental perspective view of a surfboard 1000 with a binding installed thereon the deck 1200 of the surfboard 1000.

FIG. 10 is an underneath perspective view of a mounting plate 1900 of a binding 1950. FIG. 11 is an environmental view of a surfboard 1000 that has a binding mounted on its deck 1100. FIG. 15 is another environmental perspective view of a surfboard 1000 with a binding 1950 installed thereon the deck 1200 of the surfboard 1000. FIG. 15 is an alternative view of the surfboard 1000 of FIG. 14 with the binding 1950 removed. Suitably, the binding 1950 features a mounting surface 1910 and two plugs 1920 for cooperation with the sockets 1820 of two mounts 1800 provided to the deck 1100 of the surfboard. Referring to FIG. 14, a standard Go-pro® camera mount 3300 has been provided with a plug 1920 so that the mount 3300 may be mated to the socket 1820 of a mount 1800 provided to the surface of the surfboard.

Figure 12:
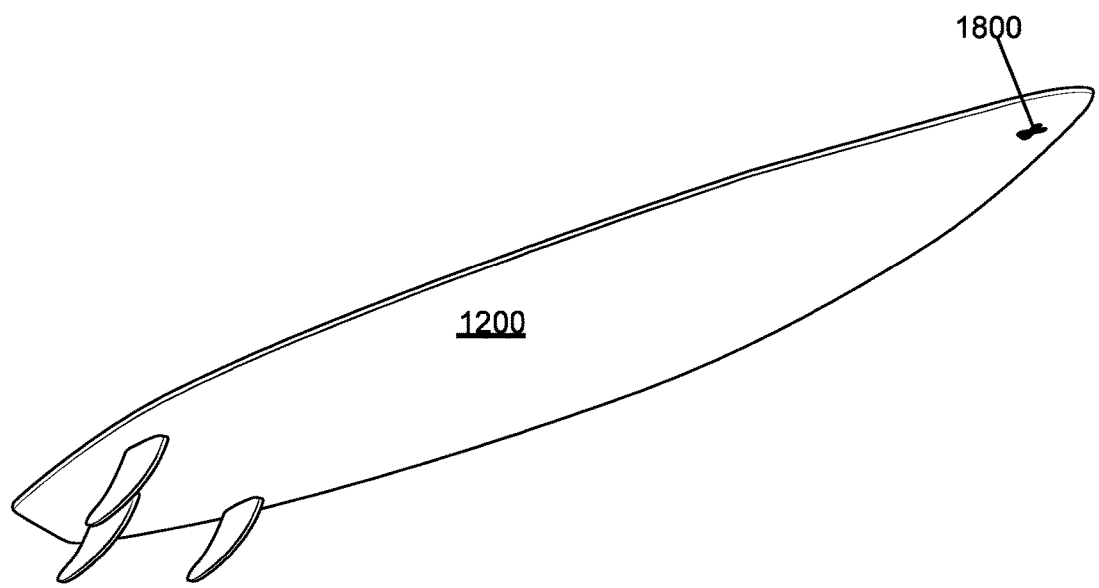
FIG. 12 is an underneath perspective view of the bottom 1200 of a surfboard with a mount 1800 installed thereon the bottom 1200.
Figure 13:
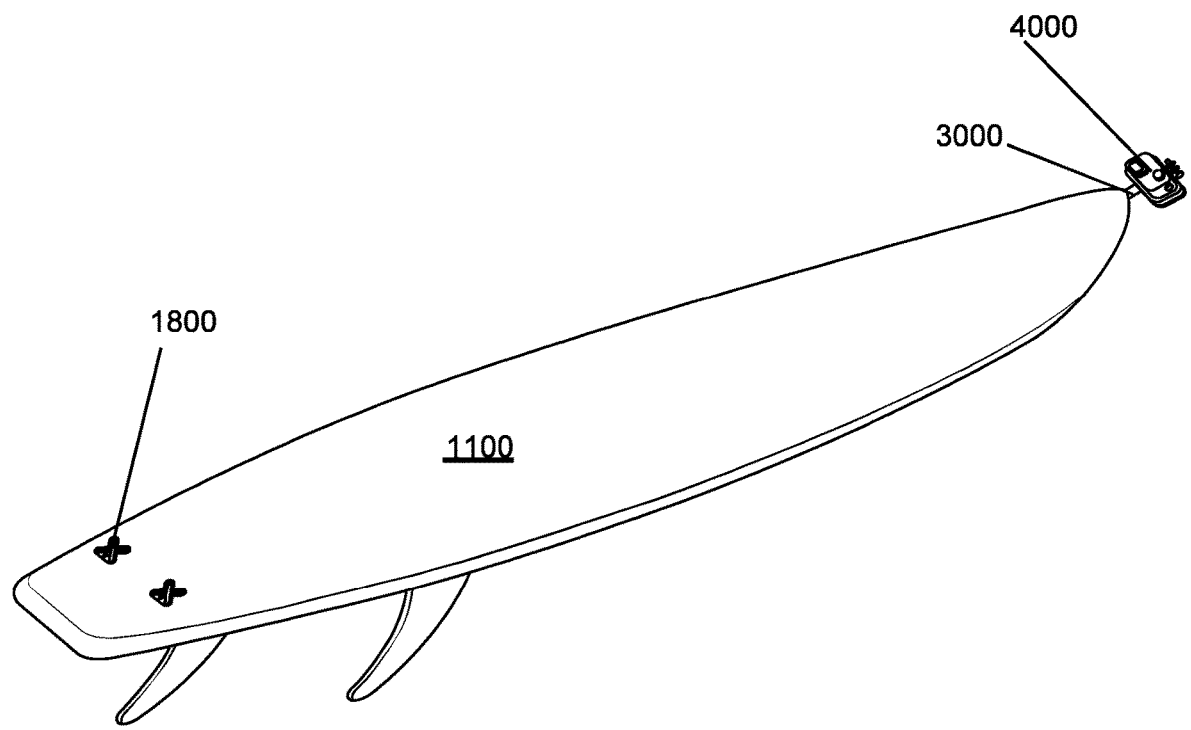
FIG. 13 is a perspective view of a camera 4000 mounted on a pole 300 and coupled to a mount 1800 (not shown; see FIG. 12)
Figure 16:
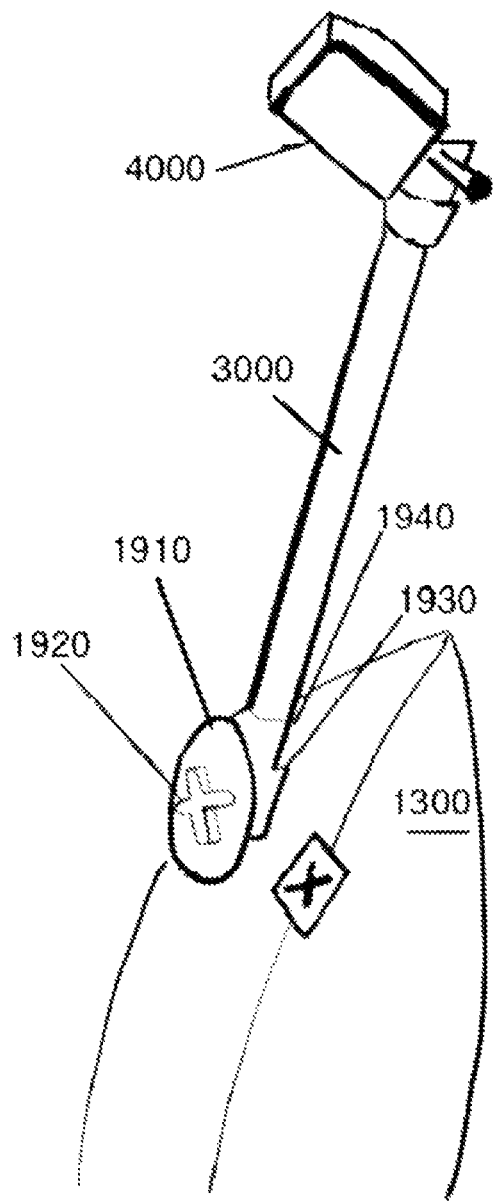
FIG. 16 is an underneath view of the surfboard 1000 with a mount 1800 disposed on the bottom 1200 front 1300 of the surfboard 1800, a mounting plate 1900 with mounting surface 1910 and plug 1920 for attaching a camera 400 on the end of a pole 3000 to the surfboard.
Figure 17:
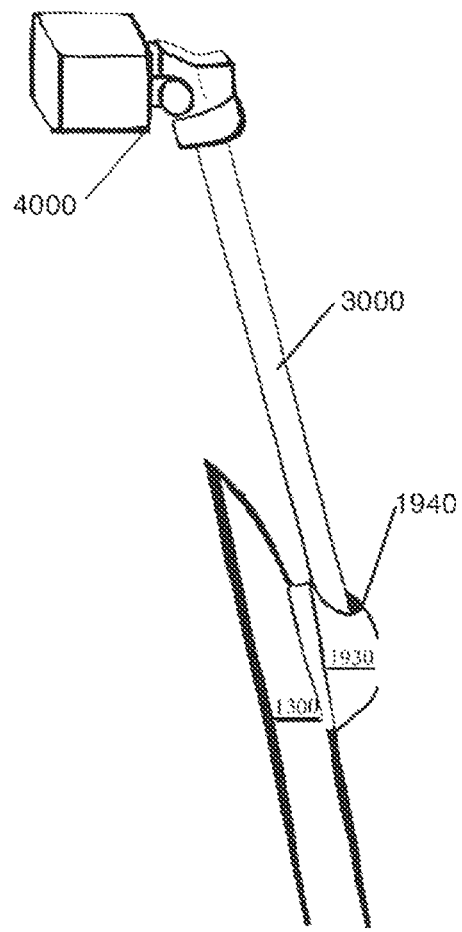
FIG. 17 is a side view of FIG. 16 with the mounting plate 1900 installed on the surfboard.

FIG. 12 is an underneath perspective view of the bottom 1200 of a surfboard with a mount 1800 installed thereon the bottom 1200. FIG. 13 is a perspective view of a camera 4000 mounted on a pole 300 and coupled to a mount 1800 (not shown; see FIG. 12). FIG. 16 is an underneath view of the surfboard 1000 with a mount 1800 disposed on the bottom 1200 front 1300 of the surfboard 1800, a mounting plate 1900 with mounting surface 1910 and plug 1920 for attaching a camera 400 on the end of a pole 3000 to the surfboard. FIG. 17 is a side view of FIG. 16 with the mounting plate 1900 installed on the surfboard.

FIG. 18 is a perspective exploded view of another embodiment of a camera mount 3300 and receiver 3600 assembly. FIG. 19 is an exploded view of the camera mount 3300 and receiver 3600 assembly from an upward angle perspective. FIG. 20 is an exploded view of the camera mount 3300 and receiver assembly 3600 from a front view. As shown in these three figures, the assembly suitably comprises the mount 3300 with mounting clamps 3400 and spring clip 3700, mounting rod 3800, the mounting base or receiver 3600 with a bottom surface 3500.

Figure 21A:
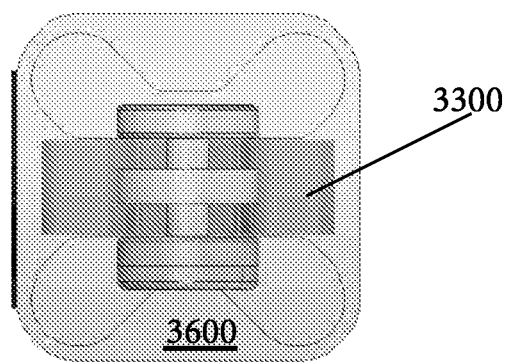
FIG. 21A is an orthogonal view of the camera mount 3300 in the mounting base 3600 from the top.
Figure 21B:
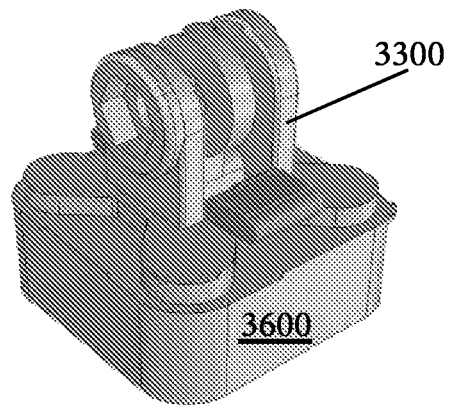
FIG. 21B is a perspective view of the camera mount 3300 in the mounting base 3600.
Figure 21C:
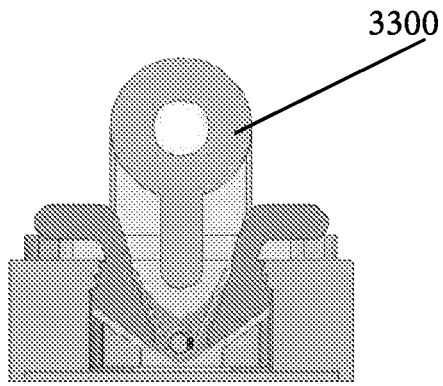
FIG. 21C is an orthogonal view of the camera mount 3300 in the mounting base 3600 from the front.
Figure 21D:
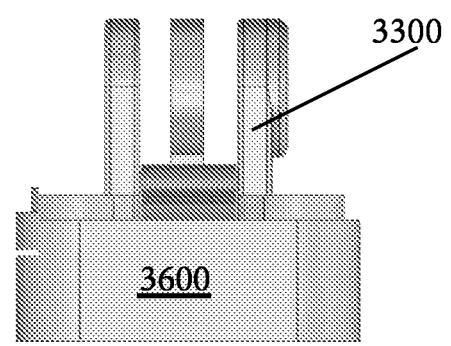
FIG. 21D is an orthogonal view of the camera mount 3300 in the mounting base 3600 from the side.

FIG. 21A is an orthogonal top view of the camera mount 3300 in the mounting base 3600 in an assembled configuration with the mount 3000 installed in the base or receiver 3600. FIG. 21B is a perspective view of the camera mount 3300 in the mounting base 3600. FIG. 21C is a cross-section of the camera mount 3300 in the mounting base 3600. FIG. 21D is an orthogonal view of the camera mount 3300 in the mounting base 3600 from the side. As shown, the receiver 3600 is adapted to receive the bottom surface on the underside via clip-in action and receive the mount 3400 on the top side via insertion. As discussed later below, the receiver 3600 may be adhered into a cutout in a surfboard or other surface as described above.

FIG. 25 is an orthogonal view of the camera mount 3300 from the top. FIG. 26 is an orthogonal view of the camera mount 3300 from the side. FIG. 27 is a perspective view of the camera mount 3300. As shown, the mount may be configured to connect to a camera via three or more couplings. On the other end, the mount 3300 may be configured to couple with the receiver 3600 (not shown) via a digited footprint as discussed above. As discussed in greater detail below, the mount 3300 may be configured with mounting clamps 3400 with teeth that interact with corresponding teeth in the receiver 3600. Suitably, the mounting camps are secured to the mount 3300 via a rod 3800 and spring clip 370 mechanism, which can be viewed in FIGS. 22 through 24.

18 through 21D and 25 through 27 show the camera mount. FIG. 18 is an exploded view of the camera mount

Figure 28A:
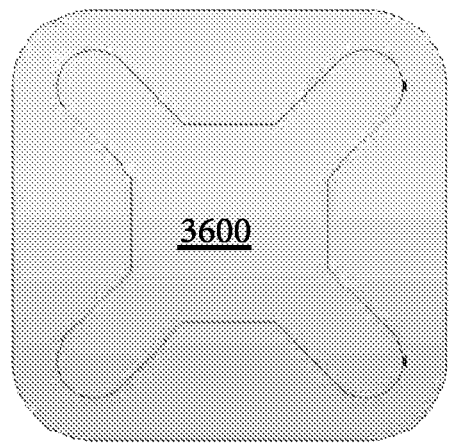
FIG. 28A is an orthogonal view of the mounting base 3600 from the top.
Figure 28B:
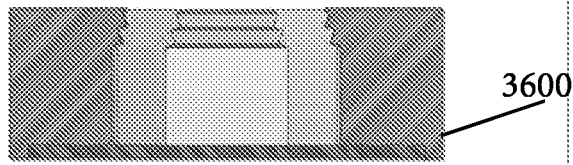
FIG. 28B is a cross section view of the mounting base 3600
Figure 28C:
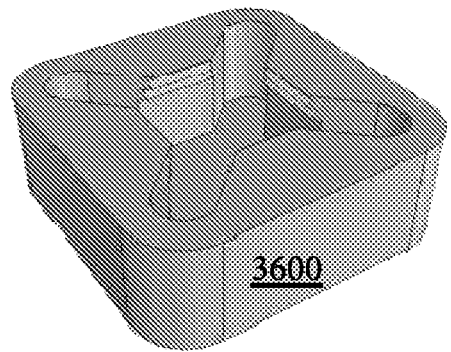
FIG. 28C is a perspective view of the mounting base 3600.

3300. The camera mount 3300 is secured to the mounting base 3600 via the spring clip, the connecting rod 3800, and mounting clamps 3400. As shown in FIGS. 28A-C, the mounting base 3600 exhibits an indenture or receptacle or socket that may be any shape, preferably a digited shape, like an X or ½ X, Y, K, T, Q, A, V, Z, *, +, <, >, in which the camera mount features a plug with correspondingly digited footprint that may be inserted and secured to the socket of the base or receiver 3600.

FIGS. 18 through 20 and FIG. 24 show the spring clip 3700. The spring clip 3700 encompasses the connecting rod 3800 and applies pressure to the mounting clamps 3400 which in turn apply pressure to the mounting base 3600 thereby securing the camera mount 3300 in the mounting base 3600. The connecting rod 3800, shown in FIGS. 18, 19 and 24 connect the mounting clamps 3400 to the mounting base 3600. The connecting rod 3800 achieve this connection through insertion into circular openings of the mounting clamps 3400. This encompassing connection allows for rotational movement of the mounting clamps 3400 permitting the insertion, via pinching movement, and securement of the mounting clamps 3400 to the mounting base 3600.

FIGS. 18 through 20, 21C through 24, and 28A through 28C show the mounting clamp 3400 of the mount 3300 and the receiver or base 3600. The mounting clamp 3400 is structurally similar to a hook latch with ridges on the hook portion of the mounting clamp 3400 to facilitate a secure grip between the mounting clamp 3400 and the mounting base 3600. Specifically, the base features teeth that cooperate with the teeth of the mounting clamp 3400 to secure the mount 3300 in the digited receptacle of the base or receiver 3600. Suitably, the teeth can be released from cooperation via rotation of the clamps 3400 around the mounting rod 3800. Suitably, the spring clip 3700 operates to bias the clamps towards a closed position.

FIG. 29 is a cross section of the camera mount 3300 installed in the mounting receiver or base 3600 that has been further installed in a cutout of a surfboard. As shown, the receiver 3600 may be provided with the bottom surface 3500, that may be clipped into the receiver 3600 to provide additional surface area for the adhesive to grip the receiver 3600 and therefore provide a sturdy coupling of the receiver and board within the cutout. Suitably, the receiver 3600 and mount 3300 may be generally operated as disclosed above in connection with FIGS. 1 through 17.

Figure 30A:
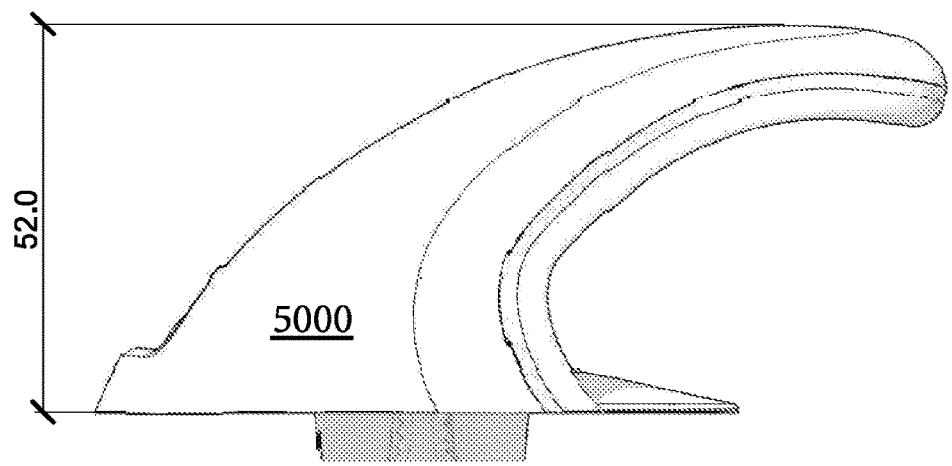
FIG. 30A is a side view of the foothold 5000 showing.
Figure 30B:
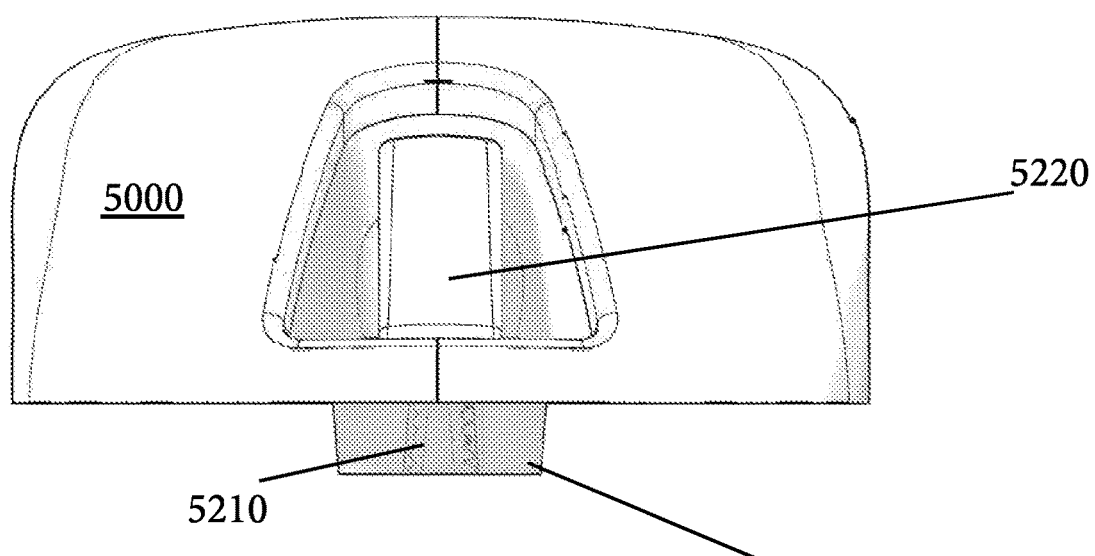
FIG. 30B is a front view of the foothold 5000.
Figure 30C:
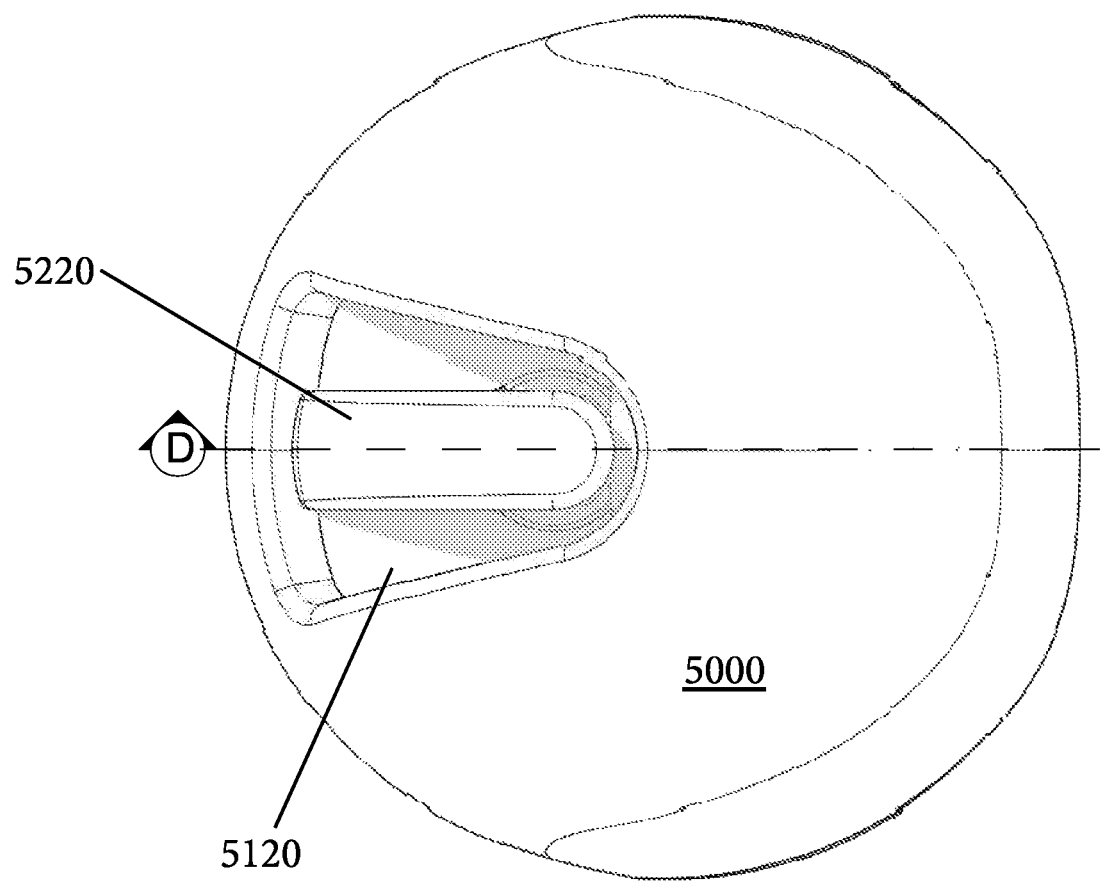
FIG. 30C is a top view of the foothold 5000.
Figure 30D:
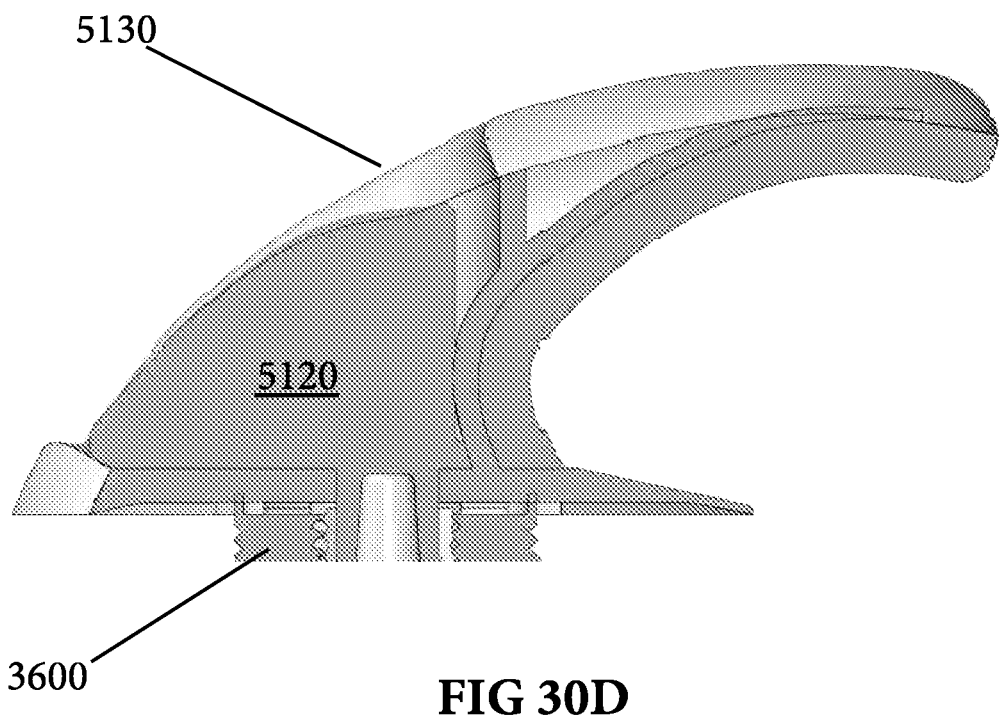
FIG. 30D is a cross-section view of the foothold 5000.
Figure 30E:
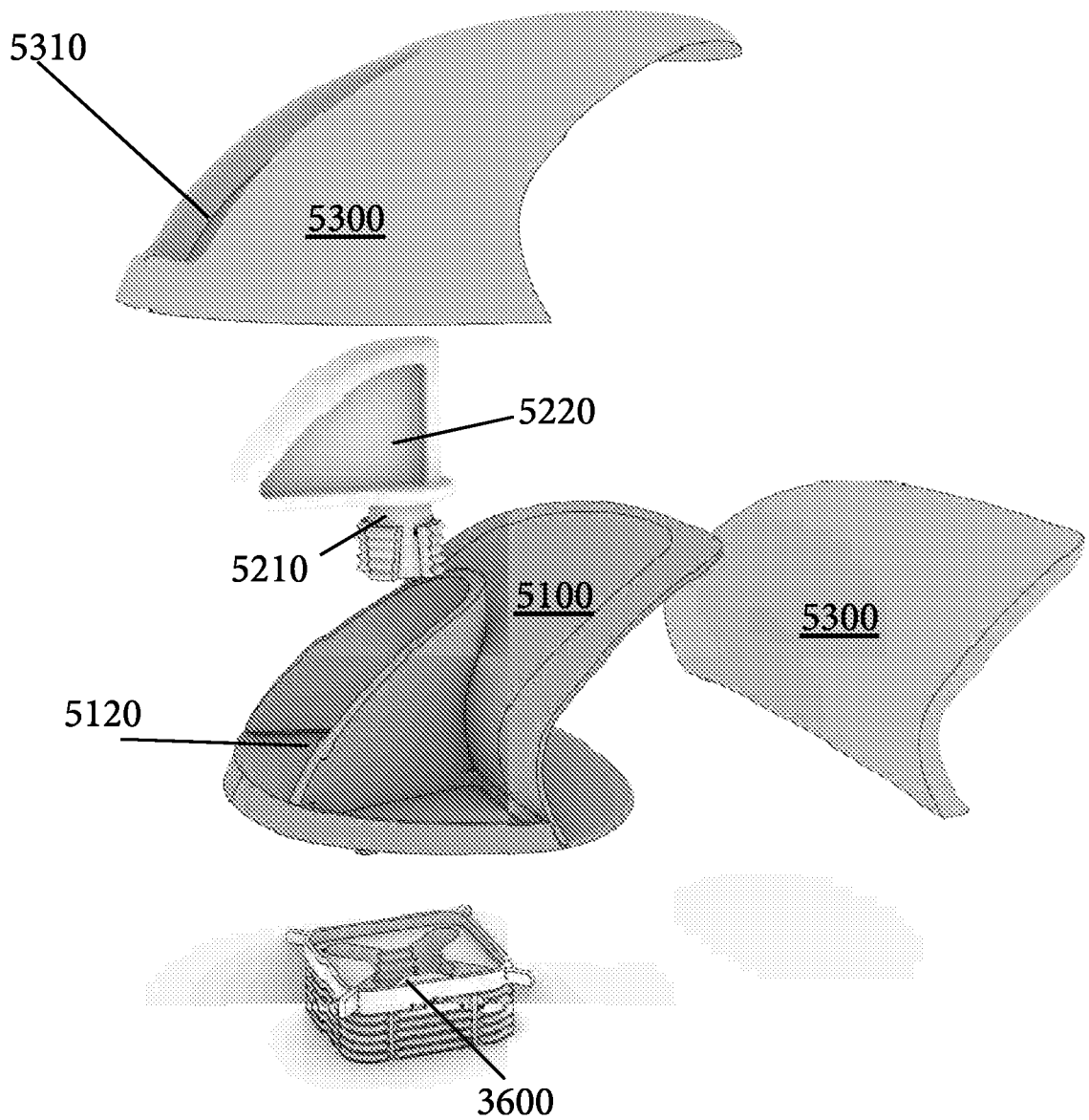
FIG. 30E is an exploded view of the foothold 5000.

FIGS. 30A through 30G show the foothold 5000. As shown in FIG. 30E, the foothold 5000 may be installed to a surface via the mounting base 3600 by insertion of the foothold flag piece 5220 and foothold securing piece 5210 through the foothold structure 5100. Specifically, as shown in FIG. 30D, the foothold securing piece 5210 passes through an opening of the foothold structure, the securement opening 5110, and is locked into the mounting base 3600 via a twisting of the foothold flag piece 5220, resulting in an alignment of the teeth of the foothold securing piece with the teeth of the mounting base 3600 which, in turn, fixates the foothold structure 5100 to the surface.

FIGS. 32A through 32D show the foothold securing piece 5210 and foothold flag piece 5220. The foothold flag piece 5220 projects superiorly from the foothold securing piece 5210 and acts as a handle for a use to twist or rotate the foothold flag piece 5220 and attached foothold securing piece 5210, resulting in an alignment of teeth between the foothold securing piece 5120 and the mounting base 3600 locking in the foothold securing piece 5210 and foothold structure 5100 through which the foothold securing piece 5210 has been inserted. In a typical embodiment, the foothold flag piece 5220 exhibits a rounded triangular shape, however, the foothold flag piece 5220 may exhibit a variety of shapes that permit a user to grip and rotate the piece.

FIGS. 31A through 31E show the foothold structure 5100. The foothold structure 5100 exhibits a securement opening 5110, a securing piece alley 5120, and a foothold platform 5130. As shown, the securing piece alley 5120 forms an opening in the foothold platform 5130 through which the foothold securing piece 5210 and foothold flag piece 5220 may be inserted. Specifically, the foothold anchors 5200 are inserted into the mounting base 3600, allowing the foothold securing piece 5210 to be inserted through the securement opening 5110 and into the mounting base 3600. The securing piece alley 5120 allots a space in which the foothold flag piece 5220 may protrude and be twisted or rotated by a user to align the teeth of the inferiorly attached foothold securing piece 5210 and the teeth of the mounting base 3600 to lock in and secure the foothold structure 5100 to the surface.

Figure 30F:
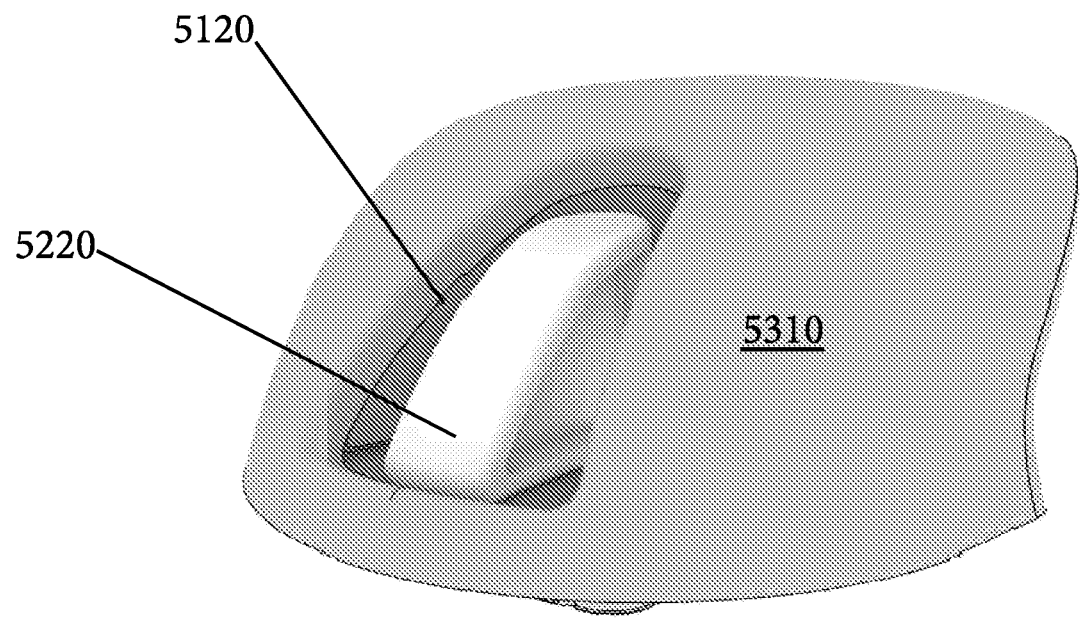
FIG. 30F is a perspective view of the foothold 5000.
Figure 30G:
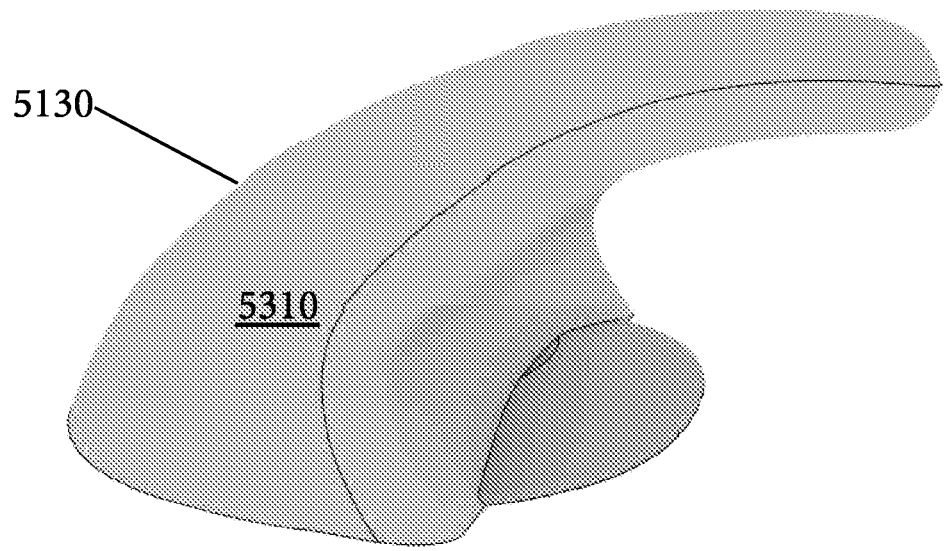
FIG. 30G is a side view of the foothold 5000 from an upward angle perspective.
Figure 31A:
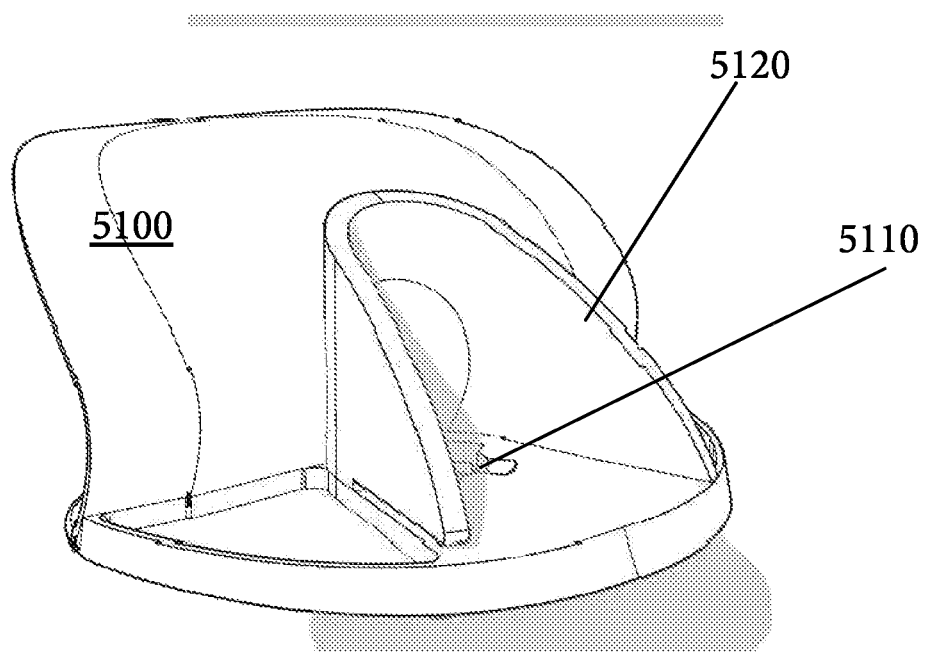
FIG. 31A is an perspective view of the foothold structure 5100.
Figure 31B:
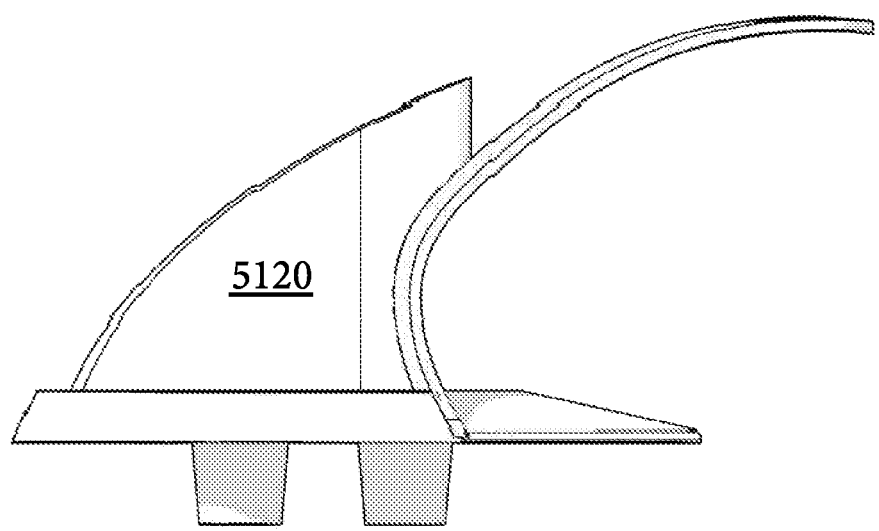
FIG. 31B is a side view of the foothold structure 5100.
Figure 31C:
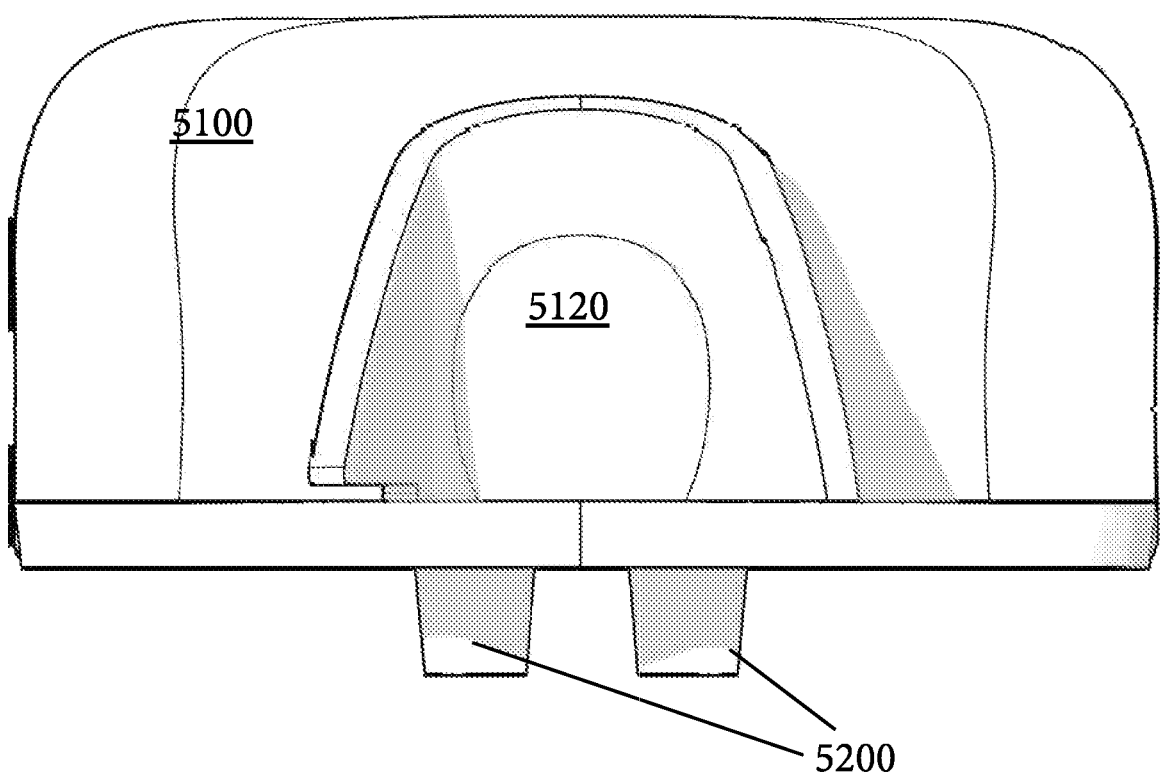
FIG. 31C is a front view of the foothold structure 5100.
Figure 31D:
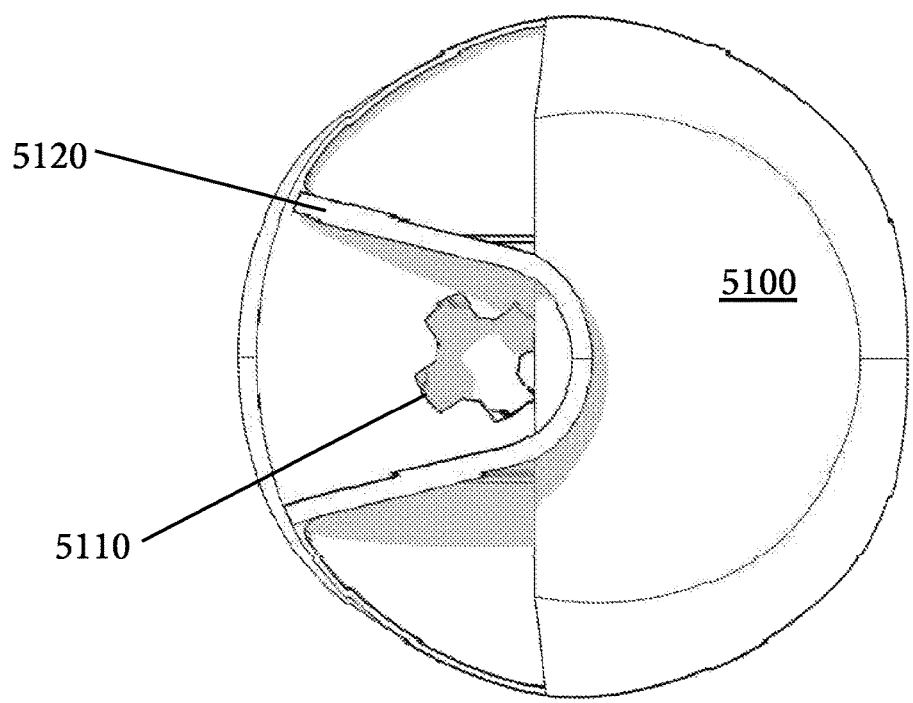
FIG. 31D is a top view of the food hold structure 5100.
Figure 31E:
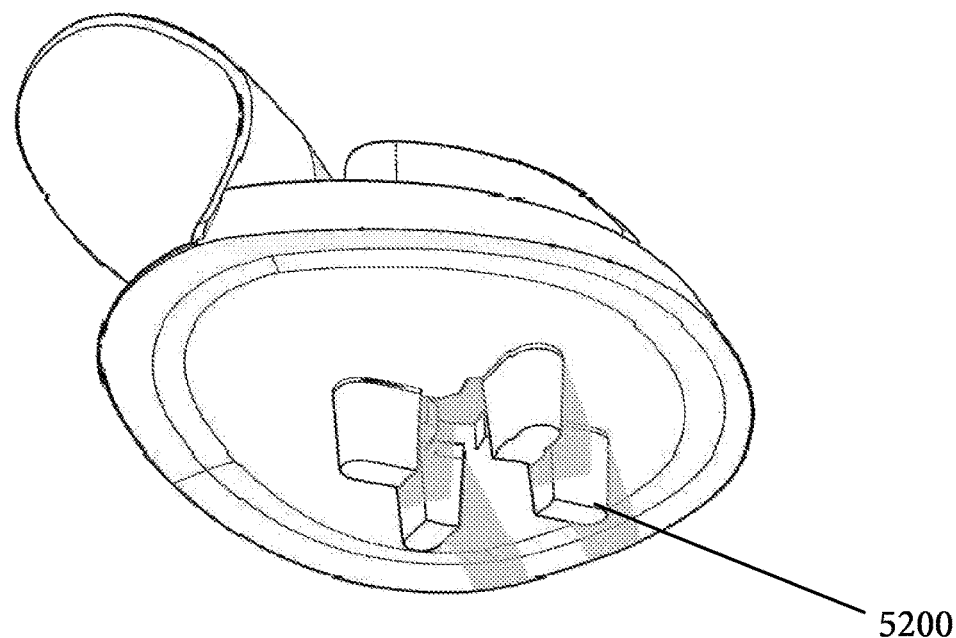
FIG. 31E is a bottom view from an upward angle of the foothold structure 5100.
Figure 32A:
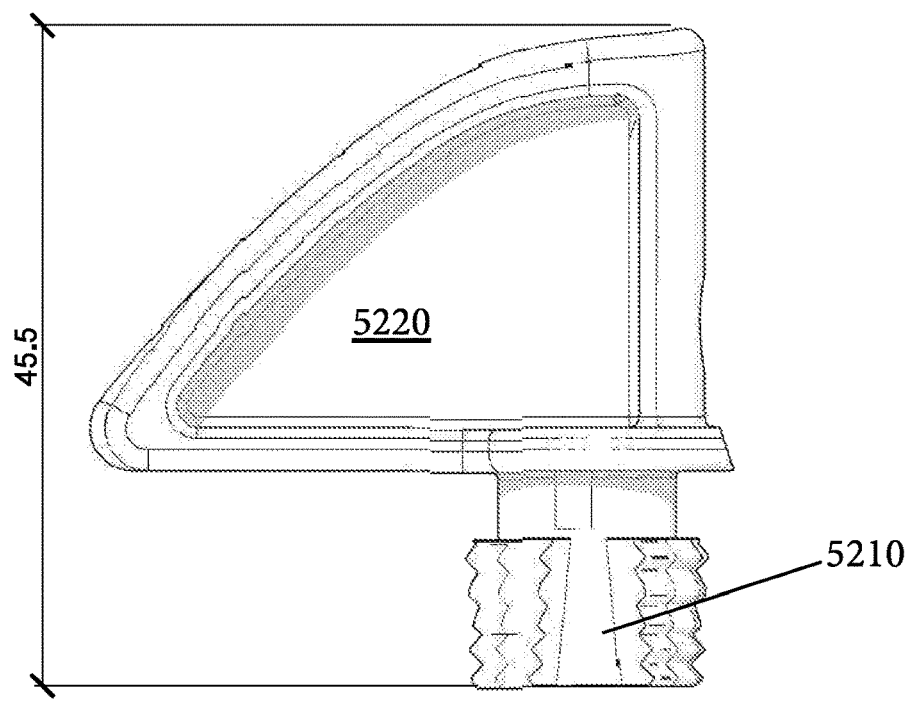
FIG. 32A is a side view of the foothold securing piece 5200.
Figure 32B:
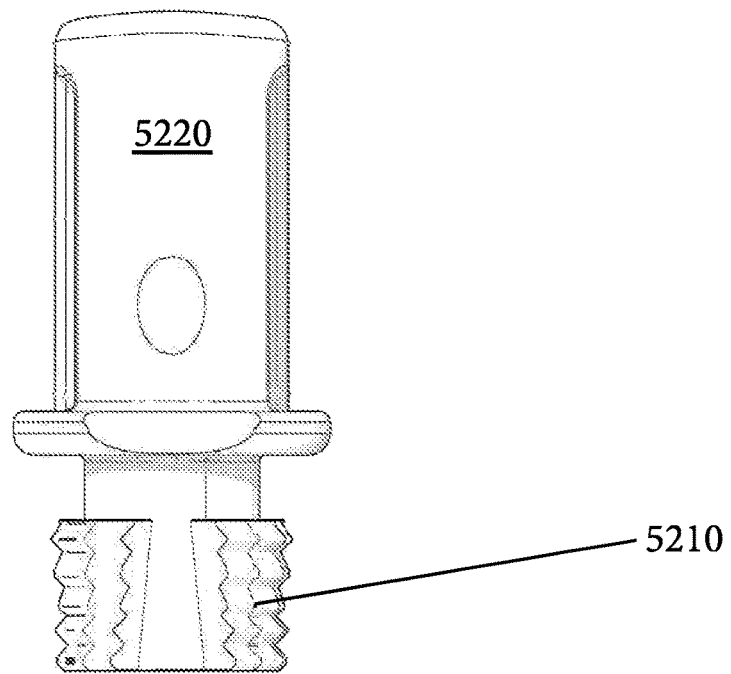
FIG. 32B is a back view of the foothold securing piece 5200.
Figure 32C:
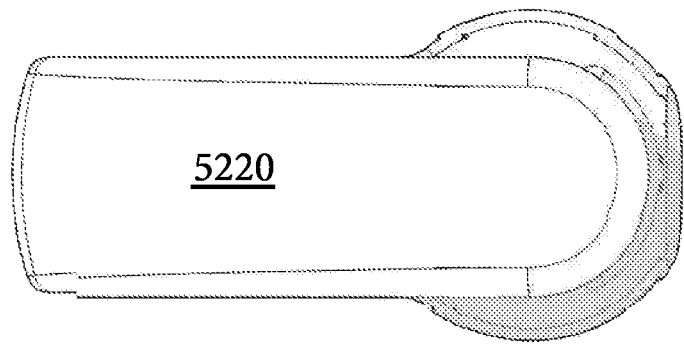
FIG. 32C is a top view of the foothold securing piece 5200.
Figure 32D:
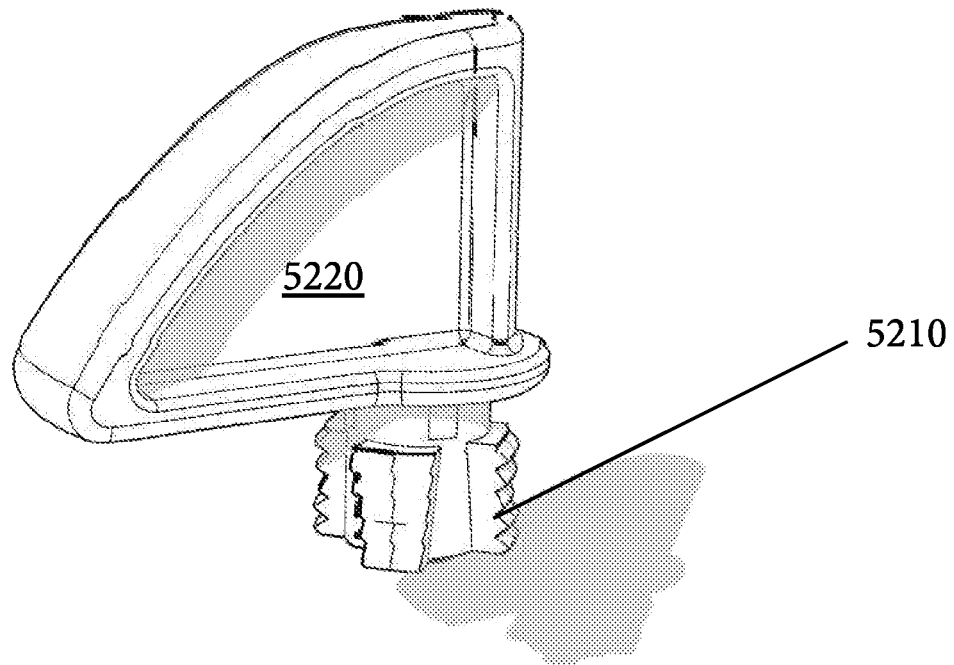
FIG. 32D is perspective view of the foothold securing piece 5200.

FIGS. 30F and 30G show the foothold hood 5300. In one embodiment, the foothold 5300 is a friction material permitting enhanced gripping by a foot to facilitate directional manipulation of the board through foot movement. The foothold hood 5300 exhibits a hood opening 5310 that outlines the securing piece alley 5120 and permits access to the foothold securing piece 5210. Through the hood opening 5310, the foothold securing piece 5210 may be twisted to release and remove the foothold 5000 from the mounting base 3600.

FIGS. 30A through 30G show the foothold 5000. As shown in FIG. 30E, the foothold 5000 may be installed to a surface via the mounting base 3600 by insertion of the foothold flag piece 5220 and foothold securing piece 5210 through the foothold structure 5100. Specifically, as shown in FIG. 30D, the foothold securing piece 5210 passes through an opening of the foothold structure, the securement opening 5110, and is locked into the mounting base 3600 via a twisting of the foothold flag piece 5220, resulting in an alignment of the teeth of the foothold securing piece with the teeth of the mounting base 3600 which, in turn, fixates the foothold structure 5100 to the surface.

FIGS. 32A through 32D show the foothold securing piece 5210 and foothold flag piece 5220. The foothold flag piece 5220 projects superiorly from the foothold securing piece 5210 and acts as a handle for a use to twist or rotate the foothold flag piece 5220 and attached foothold securing piece 5210, resulting in an alignment of teeth between the foothold securing piece 5120 and the mounting base 3600 locking in the foothold securing piece 5210 and foothold structure 5100 through which the foothold securing piece 5210 has been inserted. In a typical embodiment, the foothold flag piece 5220 exhibits a rounded triangular shape, however, the foothold flag piece 5220 may exhibit a variety of shapes that permit a user to grip and rotate the piece.

FIGS. 31A through 31E show the foothold structure 5100. The foothold structure 5100 exhibits a securement opening 5110, a securing piece alley 5120, and a foothold platform 5130. As shown, the securing piece alley 5120 forms an opening in the foothold platform 5130 through which the foothold securing piece 5210 and foothold flag piece 5220 may be inserted. Specifically, the foothold anchors 5200 are inserted into the mounting base 3600, allowing the foothold securing piece 5210 to be inserted through the securement opening 5110 and into the mounting base 3600. The securing piece alley 5120 allots a space in which the foothold flag piece 5220 may protrude and be twisted or rotated by a user to align the teeth of the inferiorly attached foothold securing piece 5210 and the teeth of the mounting base 3600 to lock in and secure the foothold structure 5100 to the surface.

FIGS. 30F and 30G show the foothold hood 5300. In one embodiment, the foothold 5300 is a friction material permitting enhanced gripping by a foot to facilitate directional manipulation of the board through foot movement. The foothold hood 5300 exhibits a hood opening 5310 that outlines the securing piece alley 5120 and permits access to the foothold securing piece 5210. Through the hood opening 5310, the foothold securing piece 5210 may be twisted to release and remove the foothold 5000 from the mounting base 3600.

Figures 33A, 33B, 34:
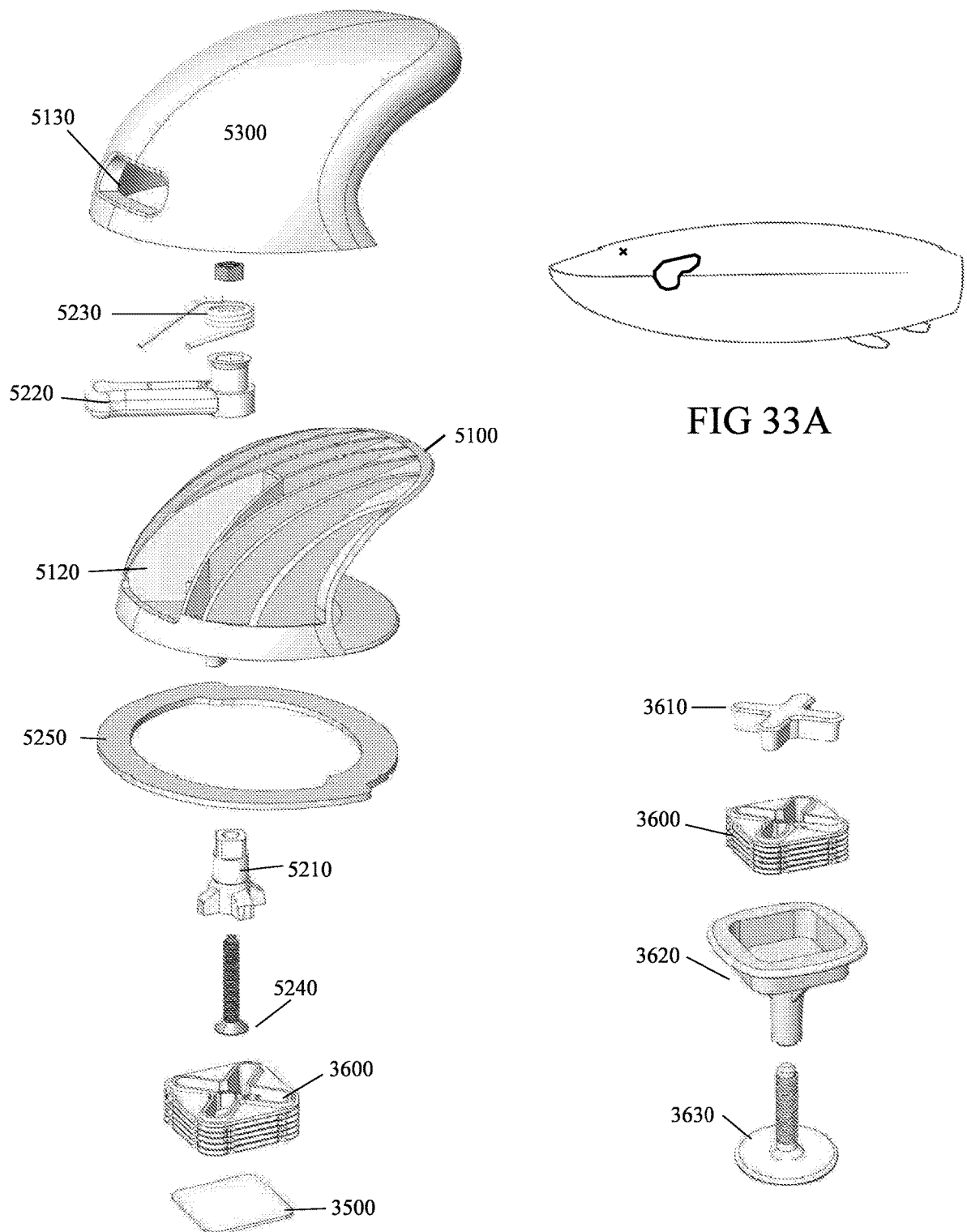
FIG. 33A shows an alternate embodiment of a foothold 5000 on a surfboard.
FIG. 33B shows an exploded view of the foothold 5000.
FIG. 34 is a perspective exploded view of another embodiment of a receiver assembly.

FIG. 33A shows another embodiment of a foothold 5000. FIG. 33B shows an exploded view of the depicted foothold 5000. As shown in these two figures, the depicted foothold 5000 may be installed to a surface.

Figure 43A:
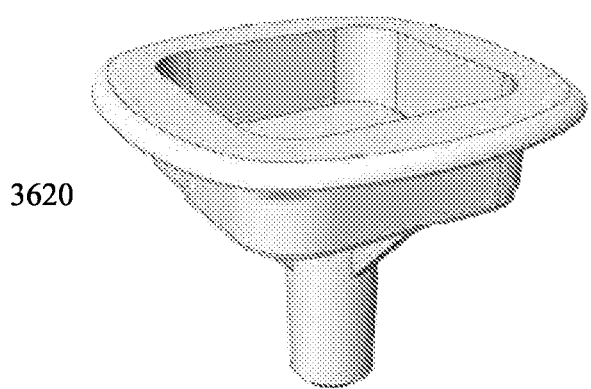
FIG. 43A shows a perspective view of the mounting base support structure 3620.
Figure 43B:
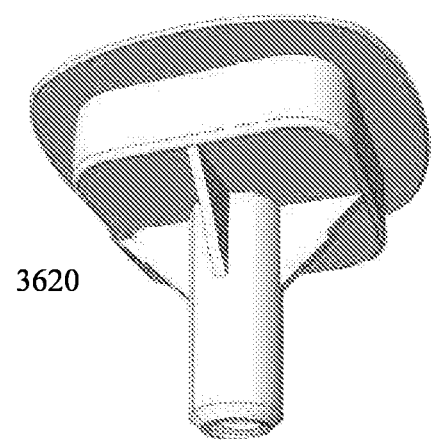
FIG. 43B shows a perspective view of the mounting base plug 3610.
Figure 44A:
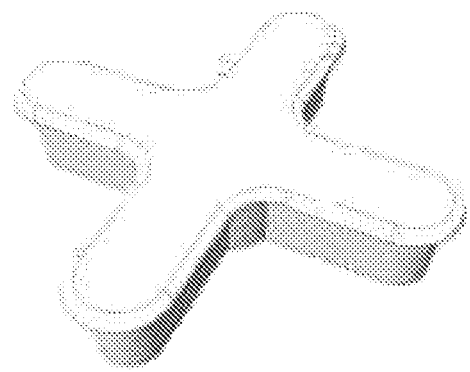
FIG. 44A shows a perspective view of the mounting base plug 3610.
Figure 44B:
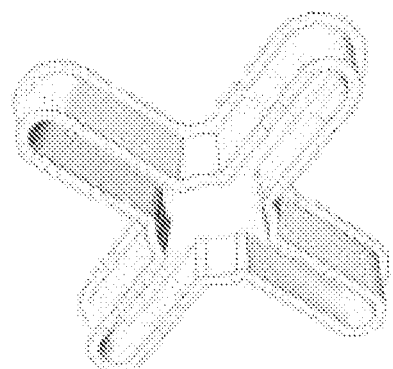
FIG. 44B shows another view of the mounting base plug 3610.
Figure 45D:
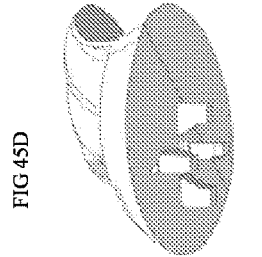
FIG. 45D shows a perspective view of the foothold structure 5100.
Figure 45C:
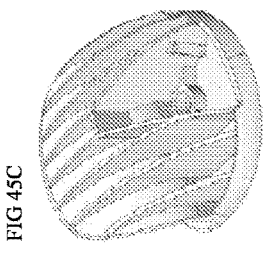
FIG. 45C shows a perspective view of the foothold structure 5100.
Figure 45G:
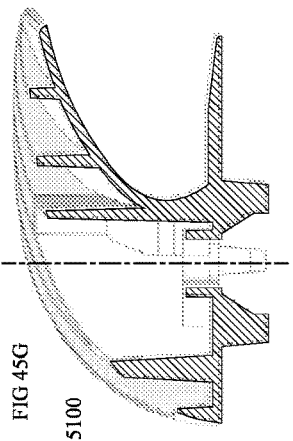
FIG. 45G shows a sectional detail view of the foothold structure 5100.
Figure 45B:
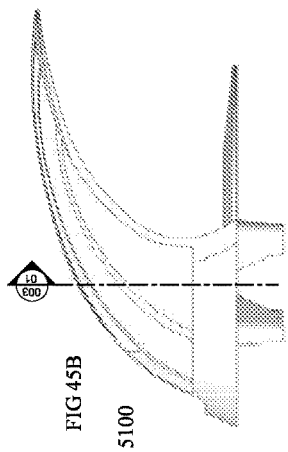
FIG. 45B shows a side detail view of the foothold structure 5100.
Figure 45F:
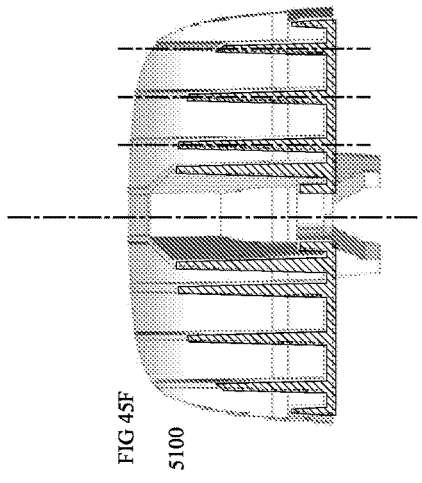
FIG. 45F shows a sectional detail view of the foothold structure 5100.
Figure 45A:
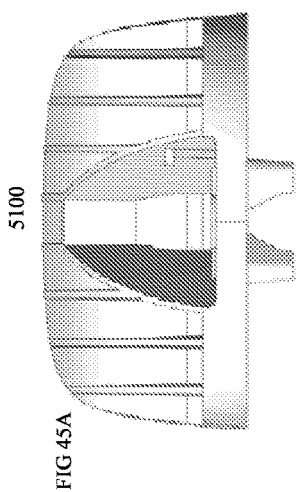
FIG. 45A shows a back detail view of the foothold structure 5100.
Figure 45E:
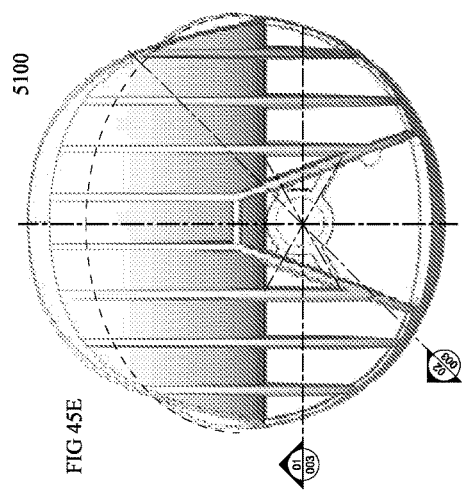
FIG. 45E shows a top detail view of the foothold structure 5100.
Figure 45H:
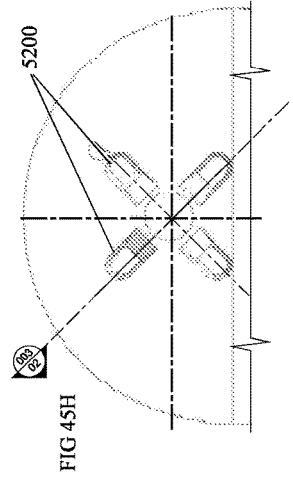
FIG. 45H shows a bottom detail view of the foothold structure 5100.
Figure 47D:
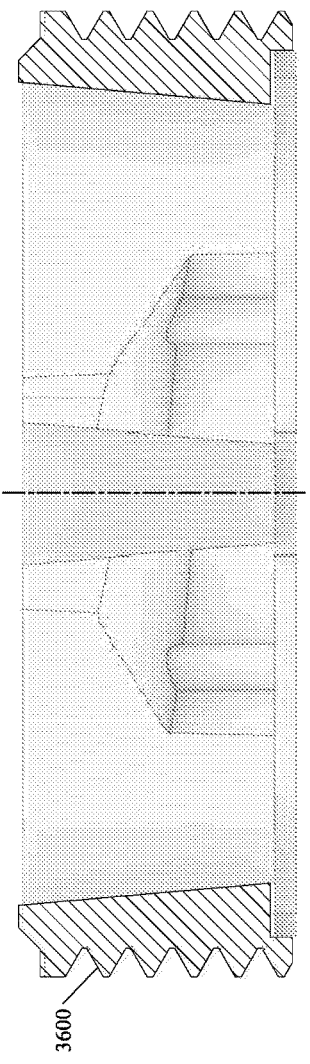
FIG. 47D shows a sectional detail view of the mounting base 3600.
Figure 47E:
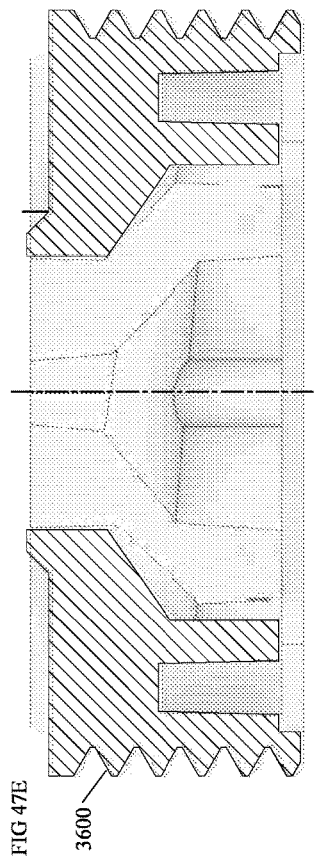
FIG. 47E shows a sectional detail view of the mounting base 3600.
Figure 47G:
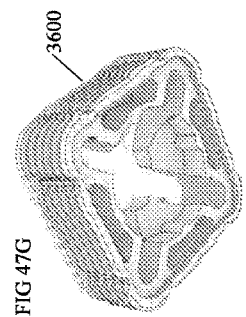
FIG. 47G shows a perspective view of the mounting base 3600.
Figure 47F:
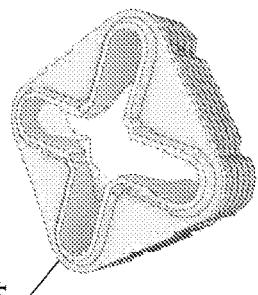
FIG. 47F shows a perspective view of the mounting base 3600.
Figure 47A:
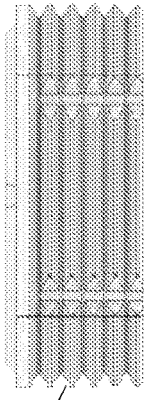
FIG. 47A shows a side detail view of the mounting base 3600.
Figure 47B:
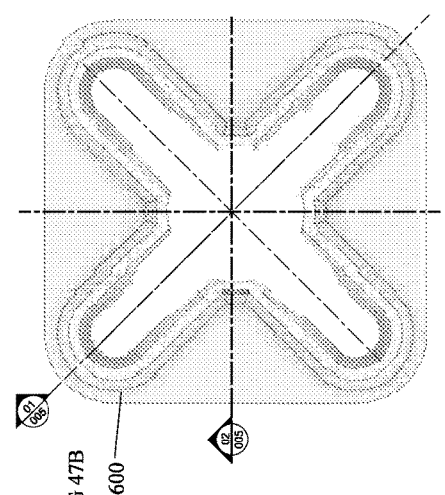
FIG. 47B shows a bottom detail view of the mounting base 3600.
Figure 47C:
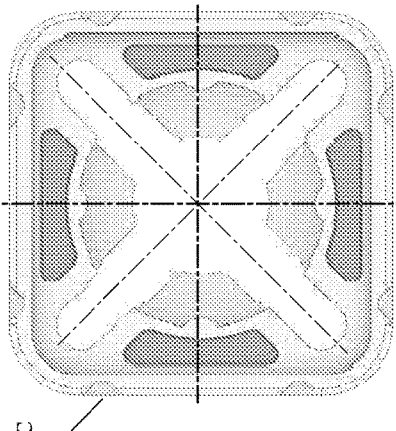
FIG. 47C shows a top detail view of the mounting base 3600.
Figure 49E:
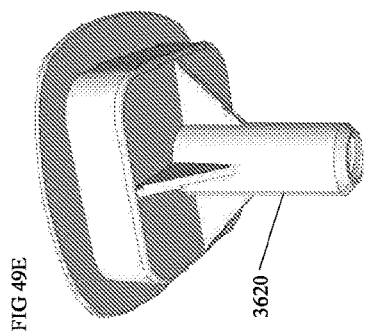
FIG. 49E shows a perspective view of the mounting base support structure 3620.
Figure 49B:
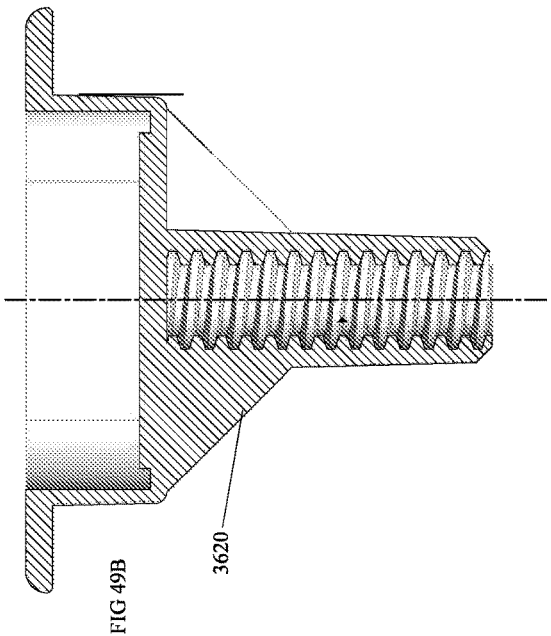
FIG. 49B shows a sectional detail view of the mounting base support structure 3620.
Figure 49D:
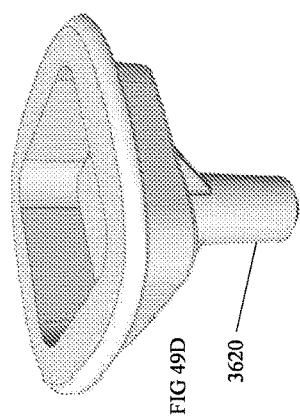
FIG. 49D shows a perspective view of the mounting base support structure 3620.
Figure 49A:
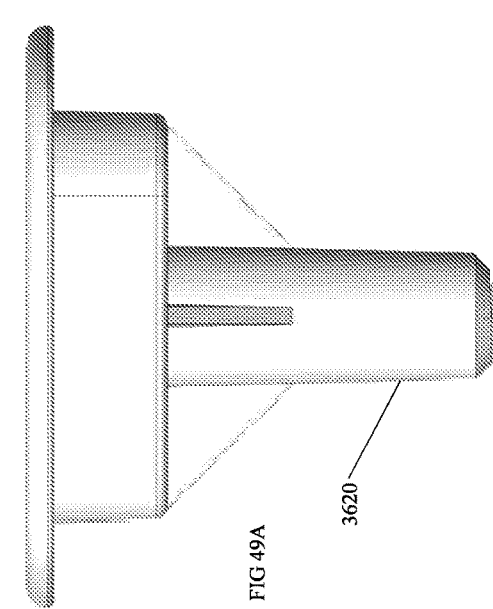
FIG. 49A shows a side detail view of the mounting base support structure 3620.
Figure 49C:
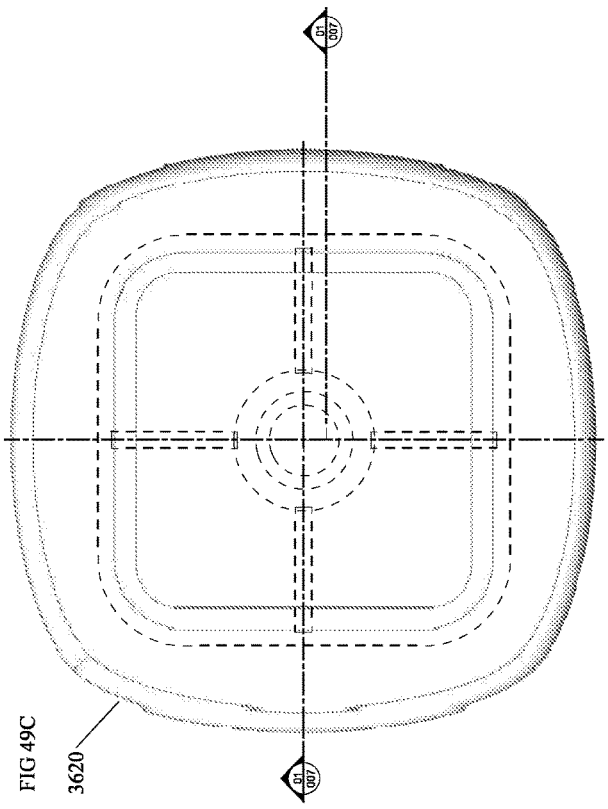
FIG. 49C shows a bottom detail view of the mounting base support structure 3620.
Figure 51:
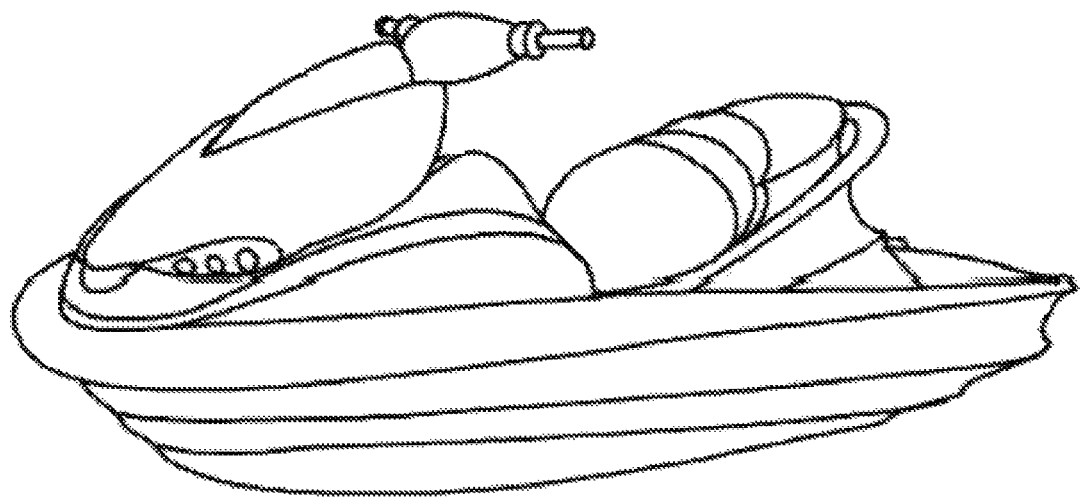
FIG. 51 is an environmental view of the foothold installed in the surface of a watercraft (like a boat or jet ski)
Figure 52A:
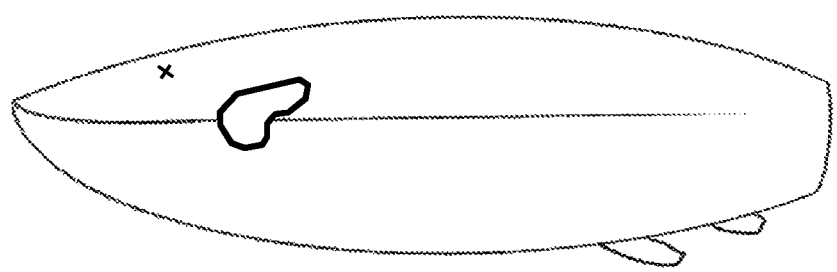
FIG. 52A is an environmental view of the foothold installed in the surface of a surfboard.
Figure 52B:
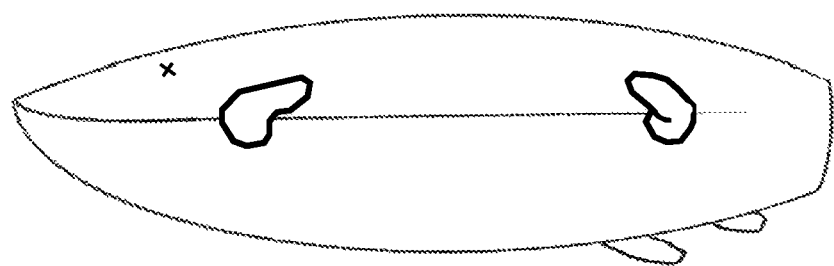
FIG. 52B is an environmental view of the foothold installed in the surface of a surfboard.
Figure 52C:
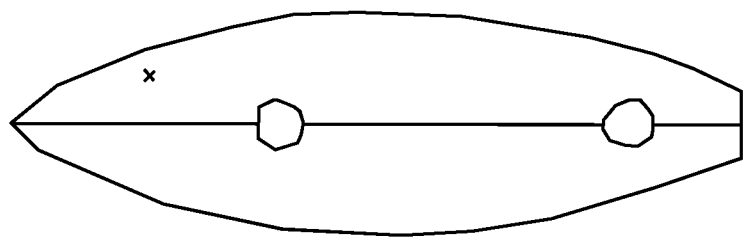
FIG. 52C is an environmental view of the foothold installed in the surface of a surfboard.
Figure 52D:
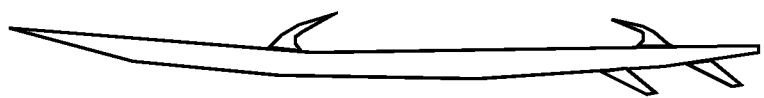
FIG. 52D is an environmental view of the foothold installed in the surface of a surfboard; and, FIG. 52E is an environmental view of the foothold installed in the surface of a surfboard.
Figure 52E:
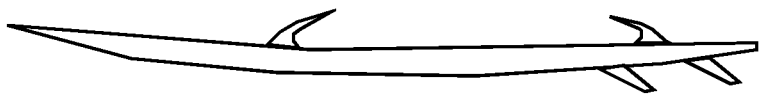

In the figures, various components are shown. The later figures show the details of these components. FIGS. 40A and 40B show perspective views of the foothold securing piece 5210. FIGS. 41A and 41B show perspective views of the receiver 3600. FIGS. 42A and 42B show perspective views of the foothold securing piece 5210 placed inside the receiver 3600. To mate or remove the foothold securing piece 5210 from the receiver 3600, one must rotate the foothold securing piece 5210 to unlock it whereby it may slide in and out of the receiver 3600. FIGS. 43A and 43B show a perspective view of the mounting base support structure 3620. FIGS. 44A and 44B shows a perspective view of the mounting base plug 3610. FIGS. 45-50 show detail views of different structures which have already been described in detail above.

As before, a base 3600 may be installed into the surface via routing a footprint or socket of the base 3600 and pressing the base 3600 into the footprint or socket. Referring back to FIGS. 3B and 3C, a routing template and gauge are respectively shown. The template 2000 suitably features cut-outs, including at least one cut out, that define router-guides 2100 that are the same size and shape as the footprint of the base 1810 of the mount 1800. Suitably, the template 2000 and guage may be constructed of plastics and, in a preferred embodiment, manufactured by a 3-D printer or stamped from a 6 millimeter aluminum plate, or by CNC machined in a 6 millimeter aluminum plate. As shown in FIG. 33B, a surface 3500 may be provided within the footprint or socket (not shown) before the base 3600 so that the base 3600 does not deepen the socket after installation.

As shown in FIGS. 33A and 33B, the depicted foothold 5000 may be installed to a surface (e.g., of a surfboard) via a mounting base 3600 by insertion of the foothold flag piece 5220 and foothold securing piece 5210 through the foothold structure 5100. Suitably, the foothold flag piece 5220 and securing piece 5210 are held in place within the structure 5100 via a bolt 5240 and nut. Specifically, the foothold securing piece 5210 passes through an opening of the foothold structure 5100, the securement opening 5110 (see FIG. 39A), and may be locked into the mounting base 3600 via a twisting of the foothold flag piece 5220 (resisted by a foothold spring 5230), resulting in an alignment of the teeth of the foothold securing piece with the teeth of the mounting base 3600 which, in turn, fixates the foothold structure 5100 to the surface.

FIG. 34 is a perspective exploded view of another embodiment of a receiver 3600 assembly. Also shown is a mounting base plug 3610, which may be placed inside the receiver 3600 when the receiver 3600 is not occupied by another attachment. Further, a mounting base support structure 3620 within which the receiver 3600 may be disposed in is also shown. The mounting base support structure 3620 is anchored by a mounting base pin 3630. The pin 3630 features a circular base which is disposed on the bottom side of the board. The interaction of the base and board secures the mounting base support structure 3620 in place.

Figure 35:
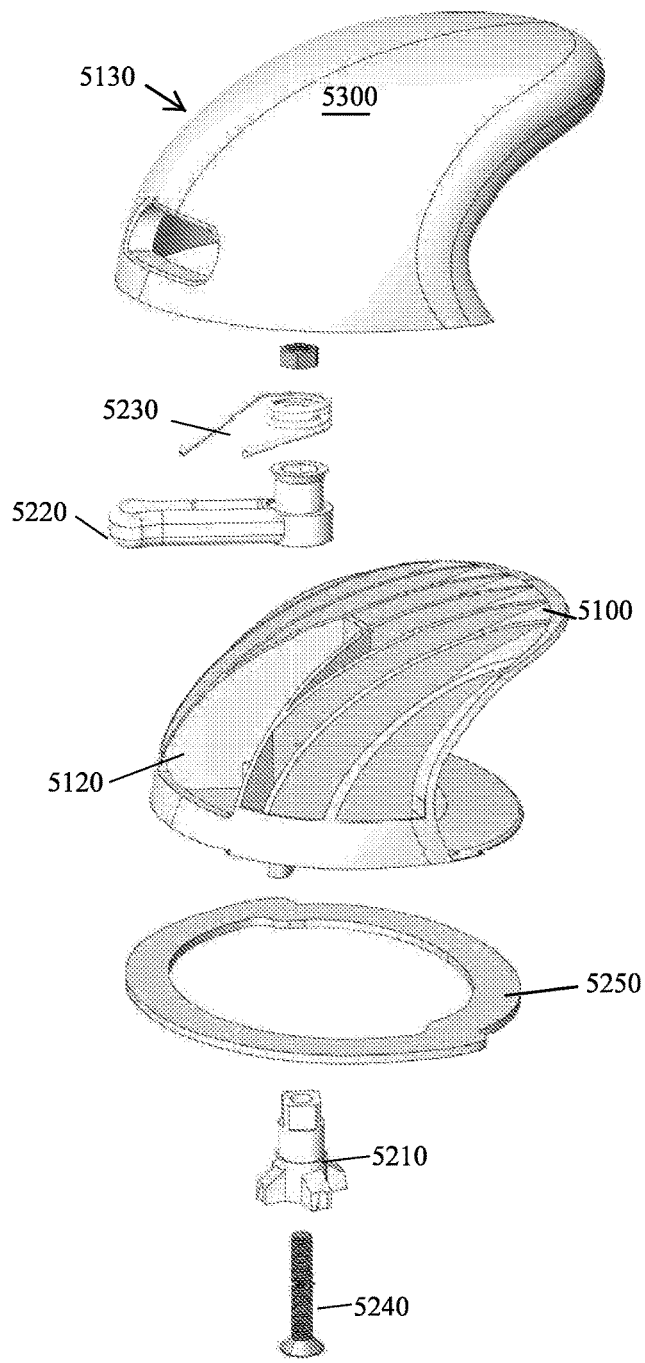
FIG. 35 shows an exploded view of the foothold 5000.

FIG. 35 shows an exploded view of the foothold 5000. As shown, the foothold securing piece 5210 passes through an opening of the foothold structure and the securement opening 5110. The twisting motion of the foothold flag piece 5220 is facilitated by a foothold spring 5230. The twisting motion results in an alignment of the teeth of the foothold securing piece with the teeth of the mounting base 3600 which, in turn, fixates the foothold structure 5100 to the surface.

Figure 36:
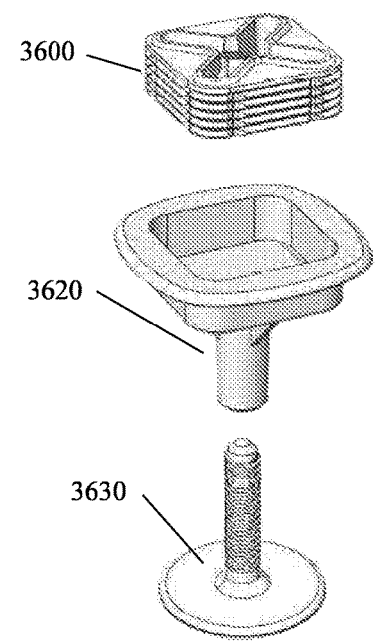
FIG. 36 is a perspective exploded view of another embodiment of a receiver 3600 assembly.

FIG. 36 is a perspective exploded view of another embodiment of a receiver 3600 assembly. A mounting base support structure 3620 within which the receiver 3600 may be disposed in is shown. The mounting base support structure 3620 is anchored by a mounting base through pin 3630. The pin 3630 features a circular base which is disposed on the bottom side of the board. The interaction of the base and board secures the mounting base support structure 3620 in place. The pin 3630 must be driven through an entire board bottom to top.

Figure 37:
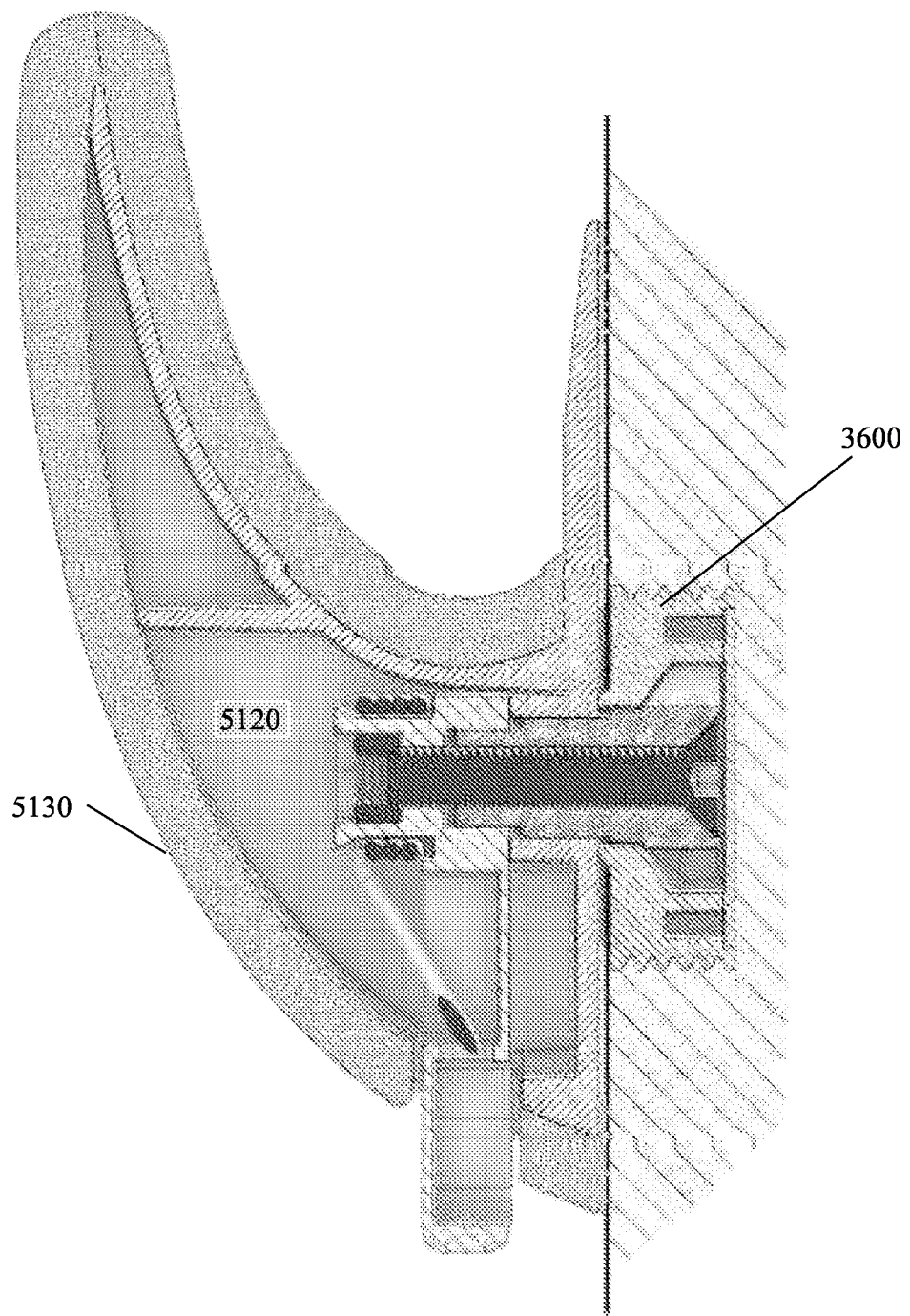
FIG. 37 shows a cross sectional view of the foothold 5000.

FIG. 37 shows a cross sectional view of the foothold 5000. As shown the foothold securing piece 5210 passes through an opening of the foothold structure, the securement opening 5110, and is locked into the mounting base 3600 via a twisting of the foothold flag piece 5220 as a result of the foothold spring 5230, resulting in an alignment of the teeth of the foothold securing piece with the teeth of the mounting base 3600 which, in turn, fixates the foothold structure 5100 to the surface.

Figure 38A:
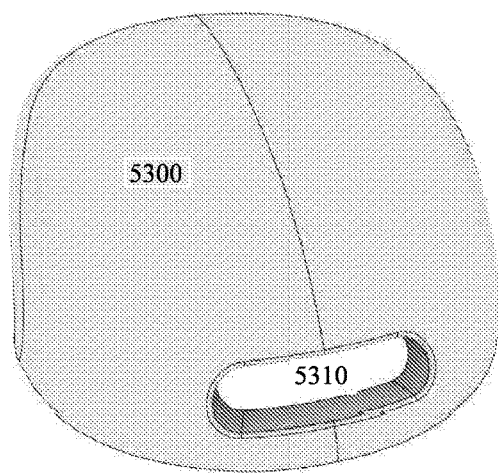
FIG. 38A shows a perspective view of the foothold hood 5300.
Figure 38B:
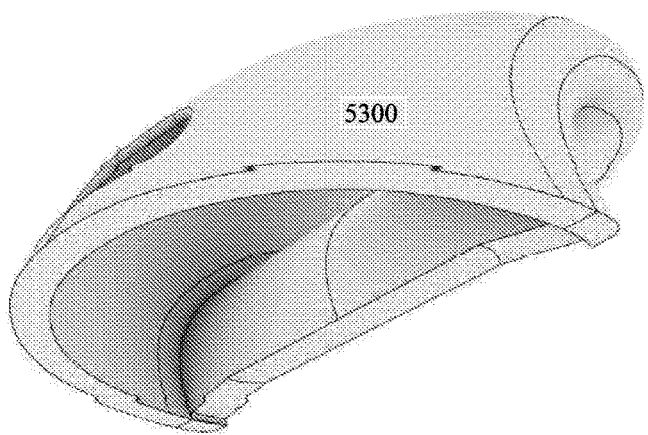
FIG. 38B shows a perspective view of the foothold hood 5300.

FIGS. 38A and 38B show perspective views of the foothold hood 5300. In one embodiment, the foothold 5300 is a friction material permitting enhanced gripping by a foot to facilitate directional manipulation of the board through foot movement. The foothold hood 5300 exhibits a hood opening 5310 that provides an opening for the securing piece alley 5120 and permits access to the foothold securing piece 5210. Through the hood opening 5310, the foothold securing piece 5210 may be twisted to release and remove the foothold 5000 from the mounting base 3600.

Figure 39A:
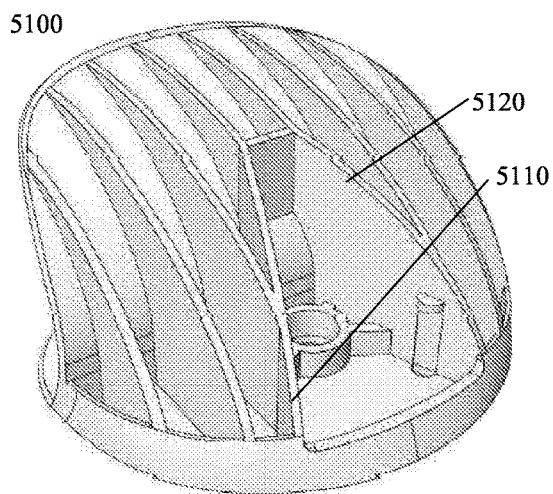
FIG. 39A shows a perspective view of the foothold structure 5100.
Figure 39B:
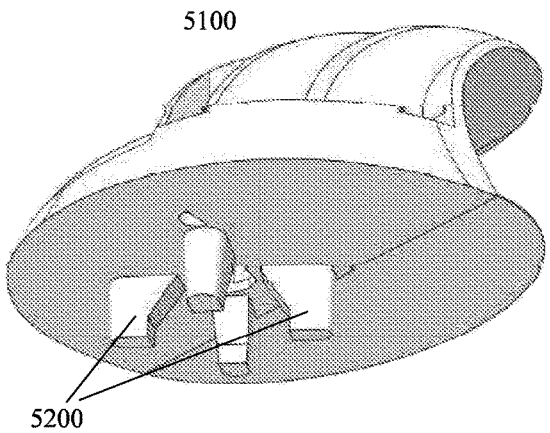
FIG. 39B shows a perspective view of the foothold structure 5100.

FIGS. 39A and 39B show the foothold structure 5100. The foothold structure 5100 exhibits a securement opening 5110, and a securing piece alley 5120. As shown, the securing piece alley 5120 forms an opening in the foothold platform 5130 through which the foothold securing piece 5210 and foothold flag piece 5220 may be inserted. Specifically, the foothold anchors 5200 are inserted into the mounting base 3600, allowing the foothold securing piece 5210 to be inserted through the securement opening 5110 and into the mounting base 3600. The securing piece alley 5120 allots a space in which the foothold flag piece 5220 may protrude and be twisted or rotated by a user to align the teeth of the inferiorly attached foothold securing piece 5210 and the teeth of the mounting base 3600 to lock in and secure the foothold structure 5100 to the surface. it should be noted that the flag piece 5220 features a square receiver for receiving the square tip of the foothold securing piece 5210 so that turning the flag piece 5210 within the alley 5120 results in a turning of the securing piece 5210. As shown in FIGS. 40A through 42B, the teeth of the securing piece are turned out of alignment with the teeth of the base 3600 so that the digited print 5200 of the foothold may be put into the base 3600 and then the teeth of the securing piece 5210 are turned into interfacing alignment with the teeth of the base 3600 so that the foothold digits 5200 cannot be pulled out of the base 3600. Suitably, the spring 5230 provides a bias toward alignment of the teeth of the piece 5210 and the base 3600. It should also be noted that, the inside of the base 3600 may feature a nub that can be inserted into a gap in the distal end of the teeth of the securing piece 5210 to resist turning of the piece 5210 when the teeth are aligned as shown in FIG. 42.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A foot hold assembly comprising:
   a foot hold structure with an alley;
   a foothold anchor defined by a foothold flag piece and a foothold securing piece with a first tooth, wherein the securing piece is provided through the alley so that a the foothold flag piece is exposed at one side of the alley and wherein said first tooth is exposed at another side of the alley, wherein said first at tooth is rotatable relative to the foothold structure by rotating said foothold securing piece within the ally whenever the foothold flag piece is rotated relative to the foothold structure;
   a receiver with a digited receptacle that is configured to receive the first tooth, wherein the digited receptacle features a second tooth that is configured to interface with the first tooth when said foothold flag piece is rotated relative to said foothold structure to a first position, and wherein said second tooth configured to avoid said first tooth when said foothold flag piece is rotated relative to the foothold structure to a second position;
   wherein the receiver is installed in a surfboard so that the digited receptacle is flush with a surface of the surf board.

2. The foothold assembly of claim 1 further comprising a foothold hood with a hood opening to access said foothold flag piece.

3. The foothold assembly of claim 2 further comprising a foothold pad.

4. The foothold assembly of claim 1 further comprising a spring for biasing the foothold flag piece to said first position.

5. A method of installing a foot hold assembly on a surfboard comprising the steps of:
   a. routing a cut-out in a surface of the surfboard;
   b. installing a receiver in the cutout, where the receiver has a footprint that matches the cutout;
   c. ensuring the receiver has a receptacle that is flush with the surface of the surfboard;
   d. installing a digit of the foothold in the receptacle, where the digit has a footprint that matches the receptacle; and,
   e. rotating a foothold flag piece to lock the digit into the receptacle.

* * * * *